(12) United States Patent
Liu et al.

(10) Patent No.: US 12,509,491 B2
(45) Date of Patent: Dec. 30, 2025

(54) MNEP MONOMER VARIANT AND APPLICATION THEREOF

(71) Applicant: QITAN TECHNOLOGY LTD., BEIJING, Beijing (CN)

(72) Inventors: Shaowei Liu, Beijing (CN); Ya Zhou, Beijing (CN); Chengyao Chen, Beijing (CN)

(73) Assignee: Qitan Technology LTD., Beijing, Beijing (CN)

( * ) Notice: Subject to any disclaimer, the term of this patent is extended or adjusted under 35 U.S.C. 154(b) by 389 days.

(21) Appl. No.: 17/764,925

(22) PCT Filed: Sep. 30, 2019

(86) PCT No.: PCT/CN2019/109333
§ 371 (c)(1),
(2) Date: Feb. 9, 2023

(87) PCT Pub. No.: WO2021/056599
PCT Pub. Date: Apr. 1, 2021

(65) Prior Publication Data
US 2024/0301010 A1    Sep. 12, 2024

(30) Foreign Application Priority Data

Sep. 29, 2019  (CN) .......................... 201910936954.6

(51) Int. Cl.
| | | |
|---|---|---|
| C07K 14/35 | (2006.01) | |
| C12N 15/70 | (2006.01) | |
| C12N 15/74 | (2006.01) | |
| C12Q 1/6869 | (2018.01) | |
| C12R 1/32 | (2006.01) | |
| G01N 33/68 | (2006.01) | |

(52) U.S. Cl.
CPC ......... *C07K 14/35* (2013.01); *G01N 33/6803* (2013.01)

(58) Field of Classification Search
None
See application file for complete search history.

(56) References Cited

FOREIGN PATENT DOCUMENTS

| | | |
|---|---|---|
| CN | 102216783 | 10/2011 |
| CN | 103460040 | 12/2013 |
| CN | 106103741 | 11/2016 |
| CN | 106459159 | 2/2017 |
| CN | 106460061 | 2/2017 |
| CN | 107109489 | 8/2017 |
| CN | 107207571 | 9/2017 |
| CN | 108699540 | 10/2018 |
| CN | 109312401 | 2/2019 |
| WO | WO 2013/057495 A3 | 4/2013 |
| WO | WO 2015/110777 A1 | 7/2015 |
| WO | WO 2016/132123 | 8/2016 |

OTHER PUBLICATIONS

Genbank Accession No. AXK74225.1 "porin [Mycolicibacterium neoaurum]," Aug. 8, 2018, 2 pages.
Guo et al., "Recent advances of DNA sequencing via nanopore-based technologies" Sci. Bull., Dec. 2014, 60(3):287-295.
International Preliminary Report on Patentability in International Appln. No. PCT/CN2019/109333, mailed on Apr. 7, 2022, 10 pages (with English Translation).
International Search Report and Written Opinion in International Appln. No. PCT/CN2019/109333, mailed on Jul. 3, 2020, 19 pages (with English translation).
Extended European Search Report in European Appln. No. 19946979.2, mailed on Dec. 18, 2023, 8 pages.
Genbank Accession No. ANE81971.1, "porin [Mycobacterium adipatum]," May 16, 2016, 2 pages.
Genbank Accession No. CP015596.1, "Mycobacterium adipatum strain YC-RL4, complete sequence," May 16, 2016, 1328 pages.
UniProt Accession No. A0A0Q9A2B0, "Porin," Jan. 20, 2016, 1 page.
UniProt Accession No. V5XH42, "Porin," Feb. 19, 2014, 1 page.

*Primary Examiner* — Manjunath N Rao
*Assistant Examiner* — Jae W Lee
(74) *Attorney, Agent, or Firm* — Fish & Richardson P.C.

(57) ABSTRACT

The present invention provides a Mnep monomer variant including an amino acid sequence with any one or more amino acid mutations at positions 92-104 of SEQ ID NO: 1, a porin or construct including at least one Mnep monomer variant, and a use thereof. The present invention also provides a method for characterizing a target polynucleotide.

18 Claims, 11 Drawing Sheets
Specification includes a Sequence Listing.

SEQUENCE LISTING

<160> NUMBER OF SEQ ID NOS: 18

<210> SEQ ID NO 1
<211> LENGTH: 191
<212> TYPE: PRT
<213> ORGANISM: Artificial Sequence
<220> FEATURE:
<223> OTHER INFORMATION: Artificially generated Mnep monomer protein
      variant

<400> SEQUENCE: 1

Met Gly Leu Asp Asn Glu Leu Ser Leu Val Asp Gly Lys Asp Arg Thr
1               5                   10                  15

Leu Thr Ile Gln Gln Trp Asp Thr Phe Leu Asn Gly Val Phe Pro Leu
            20                  25                  30

Asp Arg Asn Arg Leu Thr Arg Glu Trp Phe His Ser Gly Lys Ala Lys
        35                  40                  45

Tyr Ile Val Ser Gly Pro Gly Ala Glu Asp Phe Glu Gly Ala Leu Glu
    50                  55                  60

Leu Gly Tyr Gln Val Gly Phe Pro Trp Ser Leu Gly Val Gly Ile Asn
65                  70                  75                  80

Phe Ser Tyr Thr Thr Pro Asn Val Ala Leu Ser Lys Phe Pro Leu Phe
                85                  90                  95

Gly Ile Thr Gly Ile Gly Gly Lys Leu Pro Val Ile Gly Glu Ile Ala
            100                 105                 110

Thr Pro Pro Leu Phe Pro Gly Ala Ser Ile Ser Ala Asp Leu Gly Asn
        115                 120                 125

Gly Pro Gly Ile Gln Glu Val Ala Thr Phe Ser Thr Glu Val Ala Gly
    130                 135                 140

Pro Glu Gly Ala Val Ala Val Ser Asn Ala His Gly Thr Val Thr Gly
145                 150                 155                 160

```
Ala Ala Gly Gly Val Leu Leu Arg Pro Phe Ala Arg Leu Val Ser Ser
            165                 170                 175

Leu Gly Asp Ser Val Thr Thr Tyr Gly Glu Pro Trp Asn Met Asn
        180                 185                 190
```

<210> SEQ ID NO 2
<211> LENGTH: 576
<212> TYPE: DNA
<213> ORGANISM: Artificial Sequence
<220> FEATURE:
<223> OTHER INFORMATION: Artificially generated nucleic acid encoding a Mnep monomer variant

<400> SEQUENCE: 2

```
atgggcttag ataacgaact gtctttagtg gatggcaaag atcgcacttt aaccattcag    60
cagtgggaca cctttctgaa cggtgtgttt ccgctggatc gcaaccgttt aacccgcgag   120
tggtttcaca gcggcaaagc caaatatatt gtgagcggcc cgggtgcaga agactttgaa   180
ggcgtgctgg agctgggcta tcaagttggt tttccgtgga gtctgggcgt gggcatcaac   240
tttagctaca ccaccccgaa tgtggcactg agtaaatttc cgctgtttgg cattaccggc   300
attggcggca aactgccggt gattggcgaa attgcacccc gccgctgtt tccgggtgca   360
agcattagcg ccgatttagg taacggtccg ggcattcaag aagttgccac ctttagcacc   420
gaagtggctg gtccggaagg tgccgttgcc gtgagcaatg ctcatggcac tgtgactggt   480
gccgctggtg gcgttttact gcgcccgttt gcccgtttag tgagcagtct gggtgatagc   540
gtgaccacct atggcgaacc gtggaatatg aactaa                             576
```

<210> SEQ ID NO 3
<211> LENGTH: 863
<212> TYPE: PRT
<213> ORGANISM: Artificial Sequence
<220> FEATURE:
<223> OTHER INFORMATION: Artificially generated EF8813-1 helicase protein

<400> SEQUENCE: 3

```
Met Gly Ser Ser His His His His His His Ser Ser Gly Leu Val Pro
1               5                   10                  15

Arg Gly Ser His Met Lys Ile Glu Ser Leu Asp Leu Pro Asp Glu Val
            20                  25                  30

Lys Gln Phe Tyr Leu Asp Ser Gly Ile Leu Glu Leu Tyr Pro Pro Gln
        35                  40                  45

Ala Glu Ala Val Glu Lys Gly Leu Leu Glu Gly Arg Asn Leu Leu Ala
    50                  55                  60

Ala Ile Pro Thr Ala Ser Gly Lys Thr Leu Leu Ala Glu Leu Ala Met
65                  70                  75                  80

Leu Lys Ser Ile Leu Asn Gly Gly Lys Ala Leu Tyr Ile Val Pro Leu
                85                  90                  95

Arg Ala Leu Ala Ser Glu Lys Phe Lys Arg Phe Arg Glu Phe Ser Lys
            100                 105                 110

Leu Gly Ile Arg Val Gly Ile Ser Thr Gly Asp Tyr Asp Leu Arg Asp
        115                 120                 125

Glu Gly Leu Gly Val Asn Asp Ile Ile Val Ala Thr Ser Glu Lys Thr
    130                 135                 140

Asp Ser Leu Leu Arg Asn Glu Thr Val Trp Met Gln Glu Ile Ser Val
145                 150                 155                 160
```

```
Val Val Ala Asp Glu Val His Leu Ile Asp Ser Pro Asp Arg Gly Pro
                165                 170                 175
Thr Leu Glu Ile Thr Leu Ala Lys Leu Arg Lys Met Asn Pro Ser Cys
            180                 185                 190
Gln Ile Leu Ala Leu Ser Ala Thr Ile Gly Asn Ala Asp Glu Leu Ala
            195                 200                 205
Ala Trp Leu Glu Ala Gly Leu Val Leu Ser Glu Trp Arg Pro Thr Glu
210                 215                 220
Leu Arg Glu Gly Val Phe Phe Asn Gly Thr Phe Tyr Cys Lys Asp Arg
225                 230                 235                 240
Glu Lys Ser Ile Glu Gln Ser Thr Lys Asp Glu Ala Val Asn Leu Val
                245                 250                 255
Leu Asp Thr Leu Arg Glu Asp Gly Gln Cys Leu Val Phe Glu Asn Ser
            260                 265                 270
Arg Lys Asn Cys Met Ala Phe Ala Lys Lys Ala Ser Ser Ala Val Lys
            275                 280                 285
Lys Ile Leu Ser Ala Glu Asp Lys Glu Ala Leu Ala Glu Ile Ala Asp
290                 295                 300
Glu Val Leu Glu Asn Ser Glu Thr Asp Thr Ser Ala Ala Leu Ala Ala
305                 310                 315                 320
Cys Ile Arg Ser Gly Thr Ala Phe His His Ala Gly Leu Thr Thr Pro
                325                 330                 335
Leu Arg Glu Leu Val Glu Asp Gly Phe Arg Ala Gly Lys Ile Lys Leu
            340                 345                 350
Ile Ser Ser Thr Pro Thr Leu Ala Ala Gly Leu Asn Leu Pro Ala Arg
            355                 360                 365
Arg Val Val Ile Arg Ser Tyr Arg Arg Tyr Ser Ser Glu Asp Gly Met
370                 375                 380
Gln Pro Ile Pro Val Ile Glu Tyr Lys Gln Met Ala Gly Arg Ala Gly
385                 390                 395                 400
Arg Pro Arg Leu Asp Pro Tyr Gly Glu Ala Val Leu Val Ala Lys Ser
                405                 410                 415
Tyr Glu Glu Phe Val Phe Leu Phe Arg Asn Tyr Ile Glu Ala Asp Ala
            420                 425                 430
Glu Asp Ile Trp Ser Lys Leu Gly Thr Glu Asn Ala Leu Arg Thr His
            435                 440                 445
Val Leu Ser Thr Ile Ser Asn Gly Phe Ala Arg Thr Lys Glu Glu Leu
450                 455                 460
Met Glu Phe Leu Glu Ala Thr Phe Phe Ala Phe Gln Tyr Ser Asn Phe
465                 470                 475                 480
Gly Leu Ser Thr Val Val Asp Glu Cys Leu Asn Phe Leu Arg Gln Glu
                485                 490                 495
Glu Met Leu Glu Lys Thr Asp Thr Leu Ile Ser Thr Ser Phe Gly Lys
            500                 505                 510
Leu Val Ser Lys Leu Tyr Ile Asp Pro Leu Ser Ala Ala Arg Ile Val
            515                 520                 525
Lys Gly Leu Lys Glu Ala Lys Ile Leu Thr Glu Leu Thr Leu Leu His
530                 535                 540
Leu Val Cys Ser Thr Pro Asp Met Arg Leu Leu Tyr Met Arg Asn Gln
545                 550                 555                 560
Asp Tyr Gln Asp Ile Asn Asp Tyr Val Ile Ala His Ala Asp Glu Phe
                565                 570                 575
Val Arg Val Pro Ser Pro Phe Asn Tyr Thr Glu Tyr Glu Trp Phe Leu
```

```
              580                 585                 590
    Gly Glu Val Lys Thr Ser Leu Leu Leu Val Asp Trp Ile His Glu Lys
                595                 600                 605

Ser Glu Asn Glu Ile Cys Leu Lys Phe Gly Ile Gly Glu Gly Asp Ile
                610                 615                 620

His Ala Ile Ala Asp Ile Ala Glu Trp Leu Met His Val Thr Ala Gln
    625                 630                 635                 640

Leu Ala Arg Leu Leu Glu Leu Lys Gly Ala Lys Glu Ala Ala Glu Leu
                    645                 650                 655

Glu Lys Arg Ile His Tyr Gly Ala Ser Pro Glu Leu Met Asp Leu Leu
                660                 665                 670

Asp Ile Arg Gly Ile Gly Arg Met Arg Ala Arg Lys Leu Tyr Glu Ser
                675                 680                 685

Gly Phe Arg Ser Ser Ala Glu Leu Ala Gly Ala Asp Pro Val Lys Val
                690                 695                 700

Ala Ala Leu Leu Gly Pro Lys Ile Ala Asp Arg Ile Phe Lys Gln Ile
                705                 710                 715                 720

Gly Arg Arg Glu Val Leu Pro Glu Ile Ala Glu Pro Thr Leu Pro Glu
                    725                 730                 735

Lys Ser Pro Ser Ser Gly Gln Lys Thr Ile Asn Asp Tyr Gly Thr Gly
                740                 745                 750

Gly Gly Gly Ser Trp Lys Glu Trp Leu Glu Arg Lys Val Gly Glu Gly
                755                 760                 765

Arg Ala Arg Arg Leu Ile Glu Tyr Phe Gly Ser Ala Gly Glu Val Gly
                770                 775                 780

Lys Leu Val Glu Asn Ala Glu Val Ser Lys Leu Leu Glu Val Pro Gly
    785                 790                 795                 800

Ile Gly Asp Glu Ala Val Ala Arg Leu Val Pro Gly Tyr Lys Thr Leu
                    805                 810                 815

Arg Asp Ala Gly Leu Thr Pro Ala Glu Ala Glu Arg Val Leu Lys Arg
                820                 825                 830

Tyr Gly Ser Val Ser Lys Val Gln Glu Gly Ala Thr Pro Asp Glu Leu
                835                 840                 845

Arg Glu Leu Gly Leu Gly Asp Ala Lys Ile Ala Arg Ile Leu Gly
                850                 855                 860

<210> SEQ ID NO 4
<211> LENGTH: 2592
<212> TYPE: DNA
<213> ORGANISM: Artificial Sequence
<220> FEATURE:
<223> OTHER INFORMATION: Artificially generated nucleic acid encoding a
      EF8813-1 helicase

<400> SEQUENCE: 4
atgggcagca gccatcatca tcatcatcac agcagcggcc tggtgccgcg cggcagccat      60
atgaagatcg aaagcctgga cctgccggac gaagttaaac agttttacct ggatagcggt     120
attttagaac tgtacccgcc gcaggcagaa gcagtagaaa aaggcctgtt agaaggacgt     180
aatctgctgg cagcaattcc gaccgcaagc ggtaagacac tgctggctga attagcaatg     240
ctgaaaagca tactgaatgg gggaaaagca ctgtatattg ttccgctgag agcactggca     300
tcagaaaaat ttaaacgttt tagagagttc agcaagttag gtataagagt gggtattagc     360
acaggagact atgacctgag agatgaaggt ctggtgttaa tgatattat tgtggcaaca      420 agcgaaaaaa ccgatagcct gctgcgtaat gaaaccgttt ggatgcagga aattagcgtt     480
```

```
gttgttgcag atgaagttca tctgattgat agcccggatc gtggtccgac cctggaaatt    540
accctggcaa aactgcgtaa aatgaatccg agctgtcaga ttctggcact gagcgcaacc    600
attggtaatg cagatgaact ggcagcatgg ctggaagcag gtctggttct gagcgaatgg    660
cgtccgaccg aactgcgtga aggtgttttt tttaatggta catttattg taaagatcgt     720 gaaaaagca ttgaacagag caccaaagat gaagcagtta atctggttct ggataccctg     780
cgtgaagatg gtcagtgtct ggttttgaa aatagccgta aaaattgtat ggcatttgca     840
aaaaaagcaa gcagcgcagt taaaaaaatt ctgagcgcag aagataaaga agcactggca    900
gaaattgcag atgaagttct ggaaaatagc gaaaccgata ccagcgcagc actggcagca    960
tgtattcgta gcggtacagc atttcatcat gcaggtctga ccaccccgct gcgtgaactg   1020
gttgaagatg gttttcgtgc aggtaaaaat aaactgatta gcagcacccc gaccctggca   1080
gcaggtctga atctgccggc acgtcgtgtt gttattcgta gctatcgtcg ttatagcagc   1140
gaagatggta tgcagccgat tccggttatt gaatataaac agatggcagg tcgtgcaggt   1200
cgtccgcgtc tggacccctta tggtgaagca gttctggttg caaaaagcta tgaagaattt   1260 gttttttctgt ttcgtaatta tattgaagca gatgcagaag atatttggag caaactgggt   1320
acagaaaatg cactgcgtac ccatgttctg agcaccatta gcaatggttt tgcacgtacc   1380
aaagaagaac tgatggaatt tctggaagca acctttttg catttcagta tagcaatttt   1440
ggtctgagca ccgttgttga tgaatgtctg aattttctgc gtcaggaaga aatgctggaa   1500
aaaaccgata ccctgattag caccagcttt ggtaaactgg ttagcaaaact gtatattgat  1560 ccgctgagcg cagcacgtat tgttaaaggt ctgaaagaag caaaaattct gaccgaactg   1620
accctgctgc atctggtttg tagcaccccg gatatgcgtc tgctgtatat gcgtaatcag   1680
gattatcagg atattaatga ttatgttatt gcacatgcag atgaatttgt tcgtgttccg   1740
agcccgttta attataccga atatgaatgg tttctgggtg aagttaaaac cagcctgctg   1800
ctggttgatt ggattcatga aaaaagcgaa aatgaaattt gtctgaaatt tggtattggt   1860
gaaggtgata ttcatgcaat tgcagatatt gcagaatggc tgatgcatgt taccgcacag   1920
ctggcacgtc tgctggaact gaaaggtgca aaagaagcag cagaactgga aaaacgtatt   1980
cattatggtg caagcccgga actgatggat ctgctggata ttcgtggtat tggtcgtatg   2040
cgtgcacgta aactgtatga aagcggtttt cgtagcagcg cagaactggc aggtgcagat   2100
ccggttaaag ttgcagcact gctgggtccg aaaattgcag atcgtatttt taaacagatt   2160
ggtcgtcgtg aagttctgcc ggaaattgca gaaccgaccc tgccggaaaa aagcccgagc   2220
agcggtcaga aaccattaa tgattatggt accggtggag gcggttcctg gaaggaatgg    2280
ctggagcgta ggttggcga gggccgtgcg cgtcgcctga tcgagtattt cggcagcgcg   2340
ggtgaggttg gcaaattggt cgagaatgcg gaagtcagca aattgctgga agttccgggt   2400
atcggcgacg aggctgtggc tcgcctggtg ccgggttata agaccctgcg cgatgccggt   2460
ctgaccccgg cagaagcaga gcgcgtgctg aagcgctacg gcagcgtcag caaagtgcag   2520
gaaggcgcaa cgccggacga attgcgcgag ttaggtctgg gcgacgccaa gattgcccgc   2580
attctgggtt aa                                                       2592
```

<210> SEQ ID NO 5
<211> LENGTH: 54
<212> TYPE: DNA
<213> ORGANISM: Artificial Sequence
<220> FEATURE:

<223> OTHER INFORMATION: Synthetic oligonucleotide

<400> SEQUENCE: 5
tggtttttgt ttgttttag aatttttta cactaccact gctagcattt ttca            54

<210> SEQ ID NO 6
<211> LENGTH: 45
<212> TYPE: DNA
<213> ORGANISM: Artificial Sequence
<220> FEATURE:
<223> OTHER INFORMATION: Synthetic oligonucleotide

<400> SEQUENCE: 6
tttctcacta tcccgttctc attggtgcac catcttttt tggtt                     45

<210> SEQ ID NO 7
<211> LENGTH: 15
<212> TYPE: DNA
<213> ORGANISM: Artificial Sequence
<220> FEATURE:
<223> OTHER INFORMATION: Synthetic oligonucleotide

<400> SEQUENCE: 7
tttttgcagc agcat                                                     15

<210> SEQ ID NO 8
<211> LENGTH: 45
<212> TYPE: DNA
<213> ORGANISM: Artificial Sequence
<220> FEATURE:
<223> OTHER INFORMATION: Synthetic oligonucleotide

<400> SEQUENCE: 8
aaccaaaaaa agatggtgca ccaatgagaa cgggatagtg agaaa                    45

<210> SEQ ID NO 9
<211> LENGTH: 40
<212> TYPE: DNA
<213> ORGANISM: Artificial Sequence
<220> FEATURE:
<223> OTHER INFORMATION: Synthetic oligonucleotide

<400> SEQUENCE: 9
tttttttttt tttttttttt tttttttttt tttttttttt                          40

<210> SEQ ID NO 10
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 10
tttttttttt ttttccttcc                                                20

<210> SEQ ID NO 11
<211> LENGTH: 576
<212> TYPE: DNA
<213> ORGANISM: Artificial Sequence
<220> FEATURE:
<223> OTHER INFORMATION: Artificially generated nucleic acid encoding a
      Mnep monomer variant

<400> SEQUENCE: 11
atgggcttag ataacgaact gtctttagtg gatggcaaag atcgcacttt aaccattcag    60

| | | |
|---|---|---|
| cagtgggaca cctttctgaa cggtgtgttt ccgctggatc gcaaccgttt aacccgcgag | 120 | |
| tggtttcaca gcggcaaagc caaatatatt gtgagcggcc cgggtgcaga agactttgaa | 180 | |
| ggcgtgctgg agctgggcta tcaagttggt tttccgtgga gtctgggcgt gggcatcaac | 240 | |
| tttagctaca ccaccccgaa tgtggcactg agtaaatttc cgctgtttgg cattaccggc | 300 | |
| attggcggca aactgccggt gattggcgaa attgcaaccc cgccgctgtt tccgggtgca | 360 | |
| agcattagcg ccgatttagg taacggtccg ggcattcaag aagttgccac ctttagcacc | 420 | |
| gaagtggctg gtccggaagg tgccgttgcc gtgagcaatg ctcatggcac tgtgactggt | 480 | |
| gccgctggtg gcgttttact gcgcccgttt gcccgtttag tgagcagtct gggtgatagc | 540 | |
| gtgaccacct atggcgaacc gtggaatatg aactaa | 576 | |

```
<210> SEQ ID NO 12
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 12
```

| | |
|---|---|
| ttctttttccc gtccgctcgt | 20 |

```
<210> SEQ ID NO 13
<211> LENGTH: 79
<212> TYPE: DNA
<213> ORGANISM: Artificial Sequence
<220> FEATURE:
<223> OTHER INFORMATION: Synthetic oligonucleotide

<400> SEQUENCE: 13
```

| | |
|---|---|
| tcgcgcctgt ctgcttgttt ttttttttct tttttttttt ctcactatcg cattctcatg | 60 |
| caggtcggtg gtcgcagta | 79 |

```
<210> SEQ ID NO 14
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 14
```

| | |
|---|---|
| acgagcggac gggaaaagaa | 20 |

```
<210> SEQ ID NO 15
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 15
```

| | |
|---|---|
| tttttttttt tttttttttt | 20 |

```
<210> SEQ ID NO 16
<211> LENGTH: 84
<212> TYPE: DNA
<213> ORGANISM: Artificial Sequence
<220> FEATURE:
<223> OTHER INFORMATION: Synthetic oligonucleotide

<400> SEQUENCE: 16
```

| | |
|---|---|
| ccaccccgaa tgtggcactg agtaaatttc cgctgtttgg cattaccggc attggcggca | 60 |

```
aactgccggt gattggcgaa attg                                              84

<210> SEQ ID NO 17
<211> LENGTH: 84
<212> TYPE: DNA
<213> ORGANISM: Artificial Sequence
<220> FEATURE:
<223> OTHER INFORMATION: Synthetic oligonucleotide

<400> SEQUENCE: 17
caatttcgcc aatcaccggc agtttgccgc caatgccggt aatgccaaac agcggaaatt      60
tactcagtgc cacattcggg gtgg                                             84

<210> SEQ ID NO 18
<211> LENGTH: 191
<212> TYPE: PRT
<213> ORGANISM: Artificial Sequence
<220> FEATURE:
<223> OTHER INFORMATION: Artificially generated Mnep monomer protein

<400> SEQUENCE: 18

Met Gly Leu Asp Asn Glu Leu Ser Leu Val Asp Gly Lys Asp Arg Thr
1               5                   10                  15

Leu Thr Ile Gln Gln Trp Asp Thr Phe Leu Asn Gly Val Phe Pro Leu
            20                  25                  30

Asp Arg Asn Arg Leu Thr Arg Glu Trp Phe His Ser Gly Lys Ala Lys
        35                  40                  45

Tyr Ile Val Ser Gly Pro Gly Ala Glu Asp Phe Glu Gly Val Leu Glu
    50                  55                  60

Leu Gly Tyr Gln Val Gly Phe Pro Trp Ser Leu Gly Val Gly Ile Asn
65                  70                  75                  80

Phe Ser Tyr Thr Thr Pro Asn Val Ala Leu Ser Gly Asp Pro Gly Phe
                85                  90                  95

Gly Ile Thr Gly Ile Gly Gly Ala Leu Pro Val Ile Gly Glu Ile Ala
            100                 105                 110

Thr Pro Pro Leu Phe Pro Gly Ala Ser Ile Ser Ala Asp Leu Gly Asn
        115                 120                 125

Gly Pro Gly Ile Gln Glu Val Ala Thr Phe Ser Thr Glu Val Ala Gly
    130                 135                 140

Pro Glu Gly Ala Val Ala Val Ser Asn Ala His Gly Thr Val Thr Gly
145                 150                 155                 160

Ala Ala Gly Gly Val Leu Leu Arg Pro Phe Ala Arg Leu Val Ser Ser
                165                 170                 175

Leu Gly Asp Ser Val Thr Thr Tyr Gly Glu Pro Trp Asn Met Asn
            180                 185                 190
```

MNEP MONOMER VARIANT AND APPLICATION THEREOF

TECHNICAL FIELD

The present invention relates to the technical field of characterization of nucleic acid characteristics, in particular to a Mnep monomer variant, a porin and construct including the Mnep monomer variant, and a method for characterizing a target polynucleotide by using the Mnep monomer variant or the porin.

SEQUENCE LISTING

This application contains a Sequence Listing that has been submitted electronically as an ASCII text file named "53943-0002US1 SL ST25.txt." The ASCII text file, created on Mar. 12, 2024, is 19,445 bytes in size. The material in the ASCII text file is hereby incorporated by reference in its entirety.

BACKGROUND

Nanopore sequencing is a gene sequencing technology. In nanopore sequencing, single-stranded nucleic acid molecules, as sequencing units, are allowed to pass through a nanopore capable of providing an ion current channel under the drive of an electric field force, a corresponding blockage current will be generated due to a physical space occupying effect when polynucleotides are translocated through the nanopore, and different signals generated are read in real time for further analysis to obtain sequence information of the polynucleotides. Nanopore sequencing has the following advantages: easy library construction without amplification; fast reading speed, and the reading speed of single-stranded molecules can reach tens of thousands of bases per hour; longer reading length, usually up to thousands of bases; and direct measurement of DNA or RNA modified by methylation.

However, a specific blockage current will be generated when every or a series of nucleotides pass through a nanoporin under the action of the electric field force. The current signal recorded at this time corresponds to the sequence of the polynucleotides, but usually 3-4 or more nucleotides control the current level at certain grades, so the accuracy still needs to be improved. At present, the accuracy may be improved by changing the polynucleotide structure, duration at the nanopore and developing new nanopores to control translocation of the polynucleotides.

For example, Patent WO2013057495A3 discloses a novel method for characterizing a target polynucleotide, which uses a pore and a Hel308 helicase or a molecular motor capable of binding to the target polynucleotide at an internal nucleotide. The helicase or molecular motor of the invention can effectively control movement of the target polynucleotide through the pore.

Patent CN102216783B discloses a *Mycobacterium smegmatis* porin (Msp) nanopore and sequencing is performed by using the nanopore, wherein the wild-type Msp is mutated at position 90 or 91 to improve conductivity of an analyte during sequencing and reduce translocation rate of the analyte during sequencing.

Patent CN103460040A discloses a mutant Msp monomer and application thereof in nanopore sequencing. The mutant Msp monomer shows stronger ability to distinguish between different nucleotides in nanopore sequencing.

However, there is no mention of Mnep monomer variants and application thereof in sequencing in the prior art, and there are few porins available for sequencing in the prior art. Therefore, the present invention further provides a novel nanoporin, and a Mnep monomer variant is prepared by mutating Mnep monomer wild-type protein unavailable for sequencing, and functions of the Mnep monomer variant in sequencing are confirmed.

SUMMARY

The present invention proves that a prepared Mnep monomer variant with mutation at a specific site of Mnep mutant protein may be used for nanopore sequencing, but a wild-type Mnep monomer does not have the function. In addition, by applying the porin of the present invention in nanopore sequencing may clearly see differences of various nucleotide current signals and has a high sequencing accuracy.

The "Mnep" of the present invention is derived from *Mycobacterium neoaurum*. Preferably, the "Mnep" is derived from *Mycobacterium neoaurum*.

Specifically, a first aspect of the present invention provides a Mnep monomer variant, and the Mnep monomer variant includes an amino acid sequence with any one or more amino acid mutations at positions 92-104 of SEQ ID NO: 1.

Preferably, the variant includes one or a combination of two or more of mutation of glycine (G) at position 92, mutation of aspartic (D) at position 93, mutation of glycine (G) at position 95 or mutation of alanine (A) at position 104.

Further preferably, the variant includes one of the following mutations:
a: mutation of glycine (G) at position 92; b: mutation of aspartic (D) at position 93; c: mutation of glycine (G) at position 95; d: mutation of alanine (A) at position 104; e: mutation of glycine (G) at position 92, mutation of aspartic (D) at position 93; f: mutation of glycine (G) at position 92, mutation of glycine (G) at position 95; g: mutation of glycine (G) at position 92, mutation of alanine (A) at position 104; h: mutation of aspartic (D) at position 93, mutation of glycine (G) at position 95; i: mutation of aspartic (D) at position 93, mutation of alanine (A) at position 104; j: mutation of glycine (G) at position 95 or mutation of alanine (A) at position 104; k: mutation of glycine (G) at position 92, mutation of aspartic (D) at position 93, mutation of glycine (G) at position 95; l: mutation of glycine (G) at position 92, mutation of aspartic (D) at position 93, mutation of alanine (A) at position 104; m: mutation of aspartic (D) at position 93, mutation of glycine (G) at position 95 or mutation of alanine (A) at position 104.

Most preferably, the variant includes at least one of the following mutations:

G92 is mutated to: arginine (R), glutamine (Q), lysine (K), phenylalanine (F), serine (S), asparagine (N), cysteine (C), or modified arginine (R), glutamine (Q), lysine (K), phenylalanine (F), serine (S), asparagine (N), cysteine (C) or non-natural amino acid; or D93 is mutated to: tryptophane (W), tyrosine (Y), phenylalanine (F), methionine (M), isoleucine (I), leucine (L), valine (V), proline (P), lysine (K), arginine (R), glutamine (Q) or asparagine (N), or modified tryptophane (W), tyrosine (Y), phenylalanine (F), methionine (M), isoleucine (I), leucine (L), valine (V), proline (P), lysine (K), arginine (R), glutamine (Q) or asparagine (N) or non-natural amino acid; or G95 is mutated to: proline (P), tryptophane (W), phenylalanine (F), methionine (M), alanine (A), isoleucine (I), leucine (L), valine (V), lysine (K), arginine (R), glutamine (Q) or asparagine (N), or modified proline (P), tryptophane (W), phenylalanine (F), methionine (M), alanine (A), isoleucine (I), leucine (L), valine (V), lysine (K), arginine (R), glutamine (Q), or asparagine (N) or non-natural amino acid; or A104 is mutated to: proline (P), phenylalanine (F), isoleucine (I), leucine (L), valine (V), lysine (K) or arginine (R), or modified proline (P), phenylalanine (F), isoleucine (I), leucine (L), valine (V), lysine (K), or arginine (R) or non-natural amino acid.

In one specific implementation of the present invention, the variant includes at least one of the following mutations:
(1) G92K; (2) D93F; (3) G95L; (4) A104K.

Specifically, the variant includes one of the following mutations:
1) G92K; 2) D93F; 3) G95L; 4) A104K; 5) G92K, D93F; 6) G92K, G95L; 7) G92K, A104K; 8) D93F, G95L; 9) D93F, A104K; 10) G95L, A104K; 11) G92K, D93F, G95L; 12) G92K, D93F, A104K; 13) G92K, G95L, A104K; 14) D93F, G95L, A104K; 15) G92K, D93F, G95L, A104K.

In one specific implementation of the present invention, the Mnep monomer variant includes mutations of G92K, D93F, G95L and A104K.

Preferably, the Mnep monomer variant also includes an amino acid sequence with any one or more amino acid mutations at positions 80-91 and/or positions 105-120 of SEQ ID NO: 1.

Further preferably, the Mnep monomer variant also includes an amino acid sequence with any one or more amino acid mutations at positions 1-79 and/or positions 121-191 of SEQ ID NO: 1.

Preferably, the variant also includes one or a combination of two or more of mutation of aspartic (D) at position 125, mutation of glutamic (E) at position 141, mutation of glutamic (E) at position 146, mutation of glutamic (E) at position 110, mutation of glycine (G) at position 76, mutation of glycine (G) at position 78, or mutation of glutamine (Q) at position 133.

Further preferably, the variant includes at least one of the following mutations:
D125 is mutated to: lysine (K), glutamine (Q), cysteine (C) or asparagine (N), or modified lysine (K), glutamine (Q), cysteine (C) or asparagine (N), or non-natural amino acid; or E141 is mutated to: lysine (K), asparagine (N) or glutamine (Q), or modified lysine (K), asparagine (N) or glutamine (Q), or non-natural amino acid; or E146 is mutated to: arginine (R), asparagine (N) or glutamine (Q), or modified arginine (R), asparagine (N) or glutamine (Q), or non-natural amino acid; or E110 is mutated to: phenylalanine (F), valine (V), isoleucine (I), leucine (L), alanine (A) or tyrosine (Y), or modified phenylalanine (F), valine (V), isoleucine (I), leucine (L), alanine (A) or tyrosine (Y), or non-natural amino acid; or G76 is mutated to: serine (S), threonine (T) or arginine (R), or modified serine (S), threonine (T) or arginine (R), or non-natural amino acid; or G78 is mutated to: serine (S), threonine (T) or arginine (R), or modified serine (S), threonine (T) or arginine (R), or non-natural amino acid; or Q133 is mutated to: asparagine (N), serine (S) or threonine (T), or modified asparagine (N), serine (S) or threonine (T), or non-natural amino acid.

In one specific implementation of the present invention, the variant may also include at least one of the following mutations:

D125R, E141R, E146K;
D125R, E141R, E146K, E110D;
D125R, E141R, E146K, E110D, G76K, G78K; and
D125R, E141R, E146K, E110D, G76K, G78K, Q133A.

The Mnep monomer variant of the present invention may also include other mutation types other than those described above as long as the mutation does not affect the differentiation of different polynucleotides when the polynucleotides pass through the porin.

Preferably, the variant may also include mutations introducing cysteine to link molecules for sequencing, such as nucleic acid binding proteins.

The Mnep monomer variant of the present invention may only include a narrow region fragment sequence of a porin-forming domain, and retain pore-forming activity. Excess residues may be removed or other amino acid residues may be increased, with the pore-forming activity retained. The length of the fragment may be at least 12, 20, 40, 50, 100 or 150 amino acids.

Preferably, the mnep Monomer variant may be modified to facilitate identification or purification, for example, by adding aspartic residues (asp tag), streptavidin tag, flag tag or histidine residues (His tag).

Preferably, the Mnep monomer variant may have a display marker, for example, fluorescent molecules, radioisotope $^{125}$I, radioisotope $^{35}$S, polynucleotide, biotin, antigen or antibody.

The Mnep monomer variant of the present invention also includes a molecular motor. Preferably, the molecular motor is an enzyme. Further preferably, the enzyme is a polymerase, an exonuclease or a Klenow fragment.

A second aspect of the present invention provides a construct including at least one Mnep monomer variant of the present invention, wherein the construct retains the pore-forming ability.

Preferably, the construct includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 Mnep monomer variants, wherein the Mnep monomer variants are identical or different.

Further preferably, the construct includes 1-20 Mnep monomer variants, wherein the Mnep monomer variants are identical or different.

In one specific implementation of the present invention, the construct includes 1, 2, 3, 4, 5, 6, 7, 8, 9, 10, 11, 12, 13, 14, 15, 16, 17, 18, 19 or 20 Mnep monomer variants, wherein the Mnep monomer variants are identical or different.

Preferably, the construct also includes wild-type Mnep monomers.

Further preferably, the construct includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 wild-type Mnep monomers.

In one specific implementation of the present invention, the construct includes 1-20 wild-type Mnep monomers. Specifically, the construct includes 1, 2, 3, 4, 5, 6, 7, 8, 9, 10, 11, 12, 13, 14, 15, 16, 17, 18, 19 or 20 wild-type Mnep monomers.

Preferably, the construct includes 4-10 Mnep monomer variants.

In one specific implementation of the present invention, the construct includes 4, 6, 8 or 10 Mnep monomer variants.

Preferably, the Mnep monomer variant and the Mnep monomer variant, the wild-type Mnep monomer and the wild-type Mnep monomer, as well as the Mnep monomer variant and the wild-type Mnep monomer are covalently attached.

Preferably, the Mnep monomer variant and the Mnep monomer variant, the wild-type Mnep monomer and the wild-type Mnep monomer, as well as the Mnep monomer variant and the wild-type Mnep monomer are genetically fused.

A third aspect of the present invention provides a porin including at least one Mnep monomer variant, the Mnep monomer variant includes an amino acid sequence with any one or more amino acid mutations at positions 92-104 of SEQ ID NO: 1, and the mutation results in differences in resistance in a pore due to differences in physical or chemical properties of different types of nucleotides when a single polynucleotide strand passes through the porin including at least one Mnep monomer variant.

Preferably, the mutation results in a change in charge property or hydrophobic property of amino acid.

Preferably, the differences in resistance refer to characteristics that may be used to characterize a polynucleotide, and the characteristics include the source, length, size, molecular weight, identity, sequence, secondary structure and concentration of the polynucleotide or whether a target polynucleotide is modified. Further preferably, the differences in resistance refer to sequence characteristics that may be used to characterize the polynucleotide, that is, the porin may be used for sequencing to accurately distinguish different bases of the polynucleotide.

Preferably, the polynucleotide may be natural or artificially synthesized. Further preferably, the polynucleotide may be natural DNA, RNA or modified DNA or RNA.

Still further preferably, one or more nucleotides in the target polynucleotide may be modified, for example, methylated, oxidized, damaged, abasic, protein-labeled, with tagging or a spacer linked in the middle of the polynucleotide sequence.

Still further preferably, the artificially synthesized nucleic acid is selected from peptide nucleic acid (PNA), glycerol nucleic acid (GNA), threose nucleic acid (TNA), locked nucleic acid (LNA) or other synthetic polymers with nucleoside side chains.

Preferably, the target polynucleotide is single-stranded, double-stranded or at least partially double-stranded. Preferably, the Mnep monomer variant includes one or a combination of two or more of mutation of glycine (G) at position 92, mutation of aspartic (D) at position 93, mutation of glycine (G) at position 95 or mutation of alanine (A) at position 104.

Further preferably, the Mnep monomer variant includes at least one of the following mutations:

G92 is mutated to arginine (R), glutamine (Q), lysine (K), phenylalanine (F), serine (S), asparagine (N), cysteine (C), or modified arginine (R), glutamine (Q), lysine (K), phenylalanine (F), serine (S), asparagine (N), cysteine (C) or non-natural amino acid; or D93 is mutated to tryptophane (W), tyrosine (Y), phenylalanine (F), methionine (M), isoleucine (I), leucine (L), valine (V), proline (P), lysine (K), arginine (R), glutamine (Q) or asparagine (N), or modified tryptophane (W), tyrosine (Y), phenylalanine (F), methionine (M), isoleucine (I), leucine (L), valine (V), proline (P), lysine (K), arginine (R), glutamine (Q) or asparagine (N) or non-natural amino acid; or G95 is mutated to proline (P), tryptophane (W), phenylalanine (F), methionine (M), alanine (A), isoleucine (I), leucine (L), valine (V), lysine (K), arginine (R), glutamine (Q) or asparagine (N), or modified proline (P), tryptophane (W), phenylalanine (F), methionine (M), alanine (A), isoleucine (I), leucine (L), valine (V), lysine (K), arginine (R), glutamine (Q), or asparagine (N) or non-natural amino acid; or A104 is mutated to proline (P), phenylalanine (F), isoleucine (I), leucine (L), valine (V), lysine (K) or arginine (R), or modified proline (P), phenylalanine (F), isoleucine (I), leucine (L), valine (V), lysine (K), or arginine (R) or non-natural amino acid.

Still further preferably, the Mnep monomer variant includes at least one of the following mutations:

(1) G92K; (2) D93F; (3) G95L; (4) A104K.

In one specific implementation of the present invention, the Mnep monomer variant includes mutations of G92K, D93F, G95L and A104K.

Preferably, the Mnep monomer variant also includes an amino acid sequence with any one or more amino acid mutations at positions 80-91 and/or positions 105-120 of SEQ ID NO: 1.

Further preferably, the Mnep monomer variant also includes an amino acid sequence with any one or more amino acid mutations at positions 1-79 and/or positions 121-191 of SEQ ID NO: 1.

Preferably, the Mnep monomer variant also includes one or a combination of two or more of mutation of aspartic (D) at position 125, mutation of glutamic (E) at position 141, mutation of glutamic (E) at position 146, mutation of glutamic (E) at position 110, mutation of glycine (G) at position 76, mutation of glycine (G) at position 78, or mutation of glutamine (Q) at position 133.

Further preferably, the Mnep monomer variant includes at least one of the following mutations:

D125 is mutated to: lysine (K), glutamine (Q), cysteine (C) or asparagine (N), or modified lysine (K), glutamine (Q), cysteine (C) or asparagine (N), or non-natural amino acid; or E141 is mutated to: lysine (K), asparagine (N) or glutamine (Q), or modified lysine (K), asparagine (N) or glutamine (Q), or non-natural amino acid; or E146 is mutated to: arginine (R), asparagine (N) or glutamine (Q), or modified arginine (R), asparagine (N) or glutamine (Q), or non-natural amino acid; or E110 is mutated to: phenylalanine (F), valine (V), isoleucine (I), leucine (L), alanine (A) or tyrosine (Y), or modified phenylalanine (F), valine (V), isoleucine (I), leucine (L), alanine (A) or tyrosine (Y), or non-natural amino acid; or G76 is mutated to: serine (S), threonine (T) or arginine (R), or modified serine (S), threonine (T) or arginine (R), or non-natural amino acid; or G78 is mutated to: serine (S), threonine (T) or arginine (R), or modified serine (S), threonine (T) or arginine (R), or non-natural amino acid; or Q133 is mutated to: asparagine (N), serine (S) or threonine (T), or modified asparagine (N), serine (S) or threonine (T), or non-natural amino acid.

Preferably, the porin includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 Mnep monomer variants, wherein the Mnep monomer variants are identical or different.

More preferably, the porin includes 1-20 Mnep monomer variants, specifically 1, 2, 3, 4, 5, 6, 7, 8, 9, 10, 11, 12, 13, 14, 15, 16, 17, 18, 19 or 20 Mnep monomer variants, wherein the Mnep monomer variants are identical or different.

Preferably, the porin also includes wild-type Mnep monomers.

Further preferably, the porin includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 wild-type Mnep monomers.

Still further preferably, the porin includes 1-20 wild-type Mnep monomers. Specifically, the porin includes 1, 2, 3, 4, 5, 6, 7, 8, 9, 10, 11, 12, 13, 14, 15, 16, 17, 18, 19 or 20 wild-type Mnep monomers.

In one specific implementation of the present invention, the porin includes 4-10 identical or different Mnep monomer variants.

In one specific implementation of the present invention, the porin includes 4, 6, 8 or 10 Mnep monomer variants.

Preferably, the Mnep monomer variant and the Mnep monomer variant, the wild-type Mnep monomer and the wild-type Mnep monomer, as well as the Mnep monomer variant and the wild-type Mnep monomer are covalently attached.

Preferably, the Mnep monomer variant and the Mnep monomer variant, the wild-type Mnep monomer and the wild-type Mnep monomer, as well as the Mnep monomer variant and the wild-type Mnep monomer are genetically fused.

Preferably, the Mnep monomer variants included in the porin are identical or different. For example, the porin may include eight identical or different Mnep monomer variants. Preferably, the porin includes one Mnep monomer variant and seven identical monomers, wherein the Mnep monomer variant is different from the identical monomers. Alternatively, the porin includes two identical or different Mnep monomer variants and six identical monomers, wherein the Mnep monomer variants are different from the identical monomers. Alternatively, the porin includes three identical or different Mnep monomer variants and five identical monomers, wherein the Mnep monomer variants are different from the identical monomers. Alternatively, the porin includes four identical or different Mnep monomer variants and four identical monomers, wherein the Mnep monomer variants are different from the identical monomers. Alternatively, the porin includes five identical or different Mnep monomer variants and three identical monomers, wherein the Mnep monomer variants are different from the identical monomers. Alternatively, the porin includes six identical or different Mnep monomer variants and two identical monomers, wherein the Mnep monomer variants are different from the identical monomers. Alternatively, the porin includes seven identical or different Mnep monomer variants and one monomer, wherein the Mnep monomer variants are different from the one monomer.

Preferably, the porin includes eight identical or different Mnep monomer variants.

Preferably, the porin may be homologous or heterologous.

Preferably, a pore channel diameter of a narrow region of the porin is less than 18.7 Å. Further preferably, the pore channel diameter of the narrow region of the porin is less than 17.2 Å.

Still further preferably, the pore channel diameter of the narrow region of the porin is less than 16 Å, 15 Å, 14 Å, 13 Å, 12 Å, 11 Å, 10 Å, 9 Å or 8 Å.

In one specific implementation of the present invention, the pore channel diameter of the narrow region of the porin is about 10 Å.

Preferably, the porin allows hydrated ions to flow from one side of a membrane to another layer of the membrane under the drive of an applied potential, wherein the membrane is a bilayer membrane, further preferably a lipid bilayer membrane.

A fourth aspect of the present invention provides a nucleotide sequence encoding the Mnep monomer variant, the porin including at least one Mnep monomer variant or the construct of the present invention.

Preferably, the nucleotide sequence encoding the Mnep monomer variant has 70%, 75%, 80%, 85%, 90%, 91%, 92%, 93%, 94%, 95%, 96%, 97%, 98%, 99%, 99.5% or 99.9% homology with a sequence shown in SEQ ID NO: 2 or SEQ ID NO: 11, and is a nucleotides sequence encoding the Mnep monomer variant.

In one specific implementation of the present invention, the nucleotide sequence encoding the Mnep monomer variant is shown in SEQ ID NO: 11.

A fifth aspect of the present invention provides a vector including the nucleotide sequence encoding the Mnep monomer variant, the porin or the construct of the present invention.

Preferably, the vector may provide a plasmid, virus or phage vector which has an origin of replication, a optional promoter used to express the nucleotide sequence, and a regulatory signal gene of the optional promoter. The vector may include one or more selective marker genes, such as a tetracycline resistance gene. The promoter and other expression regulatory signals may be selected to be compatible with a host cell for which an expression vector is designed. The promoter is selected from T7, trc, lac, ara or λL promoters.

The Mnep monomer variant of the present invention may be prepared by chemical synthesis or recombination, preferably by recombination.

Preferably, the vector includes a promoter operably linked to the nucleotide sequence encoding the porin including at least one Mnep monomer variant, the Mnep monomer variant or the construct of the present invention.

Further preferably, the promoter is an inducible promoter or constitutive promoter, wherein the inducible promoter is an acetamide-inducible promoter.

Preferably, the nucleotide sequence encoding the porin including at least one Mnep monomer variant includes at lease one nucleotide sequence encoding the Mnep monomer variant.

Further preferably, the nucleotide sequence encoding the porin including at least one Mnep monomer variant also includes at least one nucleotide sequence encoding the wild-type Mnep monomer.

Still further preferably, the nucleotide sequence encoding the Mnep monomer variant and the nucleotide sequence encoding the Mnep monomer variant, the nucleotide sequence encoding the Mnep monomer variant and the nucleotide sequence encoding the wild-type Mnep monomer, or the nucleotide sequence encoding the wild-type Mnep monomer and the nucleotide sequence encoding the wild-type Mnep monomer are linked by sequence encoding amino acid linker.

A sixth aspect of the present invention provides a mutant bacterium expressing the Mnep monomer variant, the construct or the porin including at least one Mnep monomer variant of the present invention. The bacterium includes:

(a) deletion of the wild-type Mnep monomer; and (b) any one of vectors of the present invention.

Preferably, the bacterium includes the vector of the promoter operably linked to the nucleotide sequence encoding the Mnep monomer variant, the construct including the Mnep monomer variant, or the porin including the Mnep monomer variant.

Further preferably, the Mnep monomer variant includes a paralog or homolog of the Mnep monomer variant.

Further preferably, the construct including the Mnep monomer variant includes a construct or monomer of the paralog or homolog of the Mnep monomer variant.

Further preferably, the porin including the Mnep monomer variant includes a porin or monomer of the paralog or homolog of the Mnep monomer variant.

Preferably, the bacterium may also include the vector of the promoter operably linked to the nucleotide sequence encoding the wild-type Mnep monomer, the construct including the wild-type Mnep monomer or the porin including the wild-type Mnep monomer.

Further preferably, the wild-type Mnep monomer includes a monomer of the paralog or homolog of the wild-type Mnep monomer.

Further preferably, the construct including the wild-type Mnep monomer is a construct or monomer of the paralog or homolog of the wild-type Mnep monomer.

Further preferably, the porin including the wild-type Mnep monomer is a porin or monomer of the paralog or homolog of the wild-type Mnep monomer.

Preferably, the bacterium is *Mycobacterium neoaurum*. Further preferably, the bacterium is *Mycobacterium neoaurum*.

A seventh aspect of the present invention provides a method for producing the Mnep porin. The method includes transforming any one of the bacteria of the present invention with any one of vectors of the present invention to induce the bacteria to express the Mnep porin.

An eighth aspect of the present invention provides a method for preparing a Mnep monomer variant, wherein the vector may be introduced into a suitable host cell. The method includes inserting the nucleotide sequence encoding the Mnep monomer variant into the vector, introducing the vector into a compatible bacterial host cell, and culturing the host cell under the condition of allowing expression of the nucleotide to produce the Mnep monomer variant of the present invention.

A ninth aspect of the present invention provides a cell including the nucleotide sequence or the vector.

Preferably, the cell is *Escherichia coli* or *Mycobacterium neoaurum*, etc. More preferably, the cell is a dam+ type strain (e.g. a DH5α strain).

A tenth aspect of the present invention provides a method for characterizing a target polynucleotide, including:
(a) contacting the target polynucleotide with the porin of the present invention so that a target polynucleotide sequence passes through the porin; and
(b) obtaining one or more characteristics of an interaction between the nucleotide and the porin when the target polynucleotide passes through the porin to characterize the target polynucleotide.

Preferably, the steps (a) and (b) are repeated for one or more times.

Preferably, the target polynucleotide in the step (a) may be bound to a polynucleotide processing enzyme derived from the polynucleotide, thus controlling a translocation rate. Further preferably, the polynucleotide processing enzyme is a polypeptide capable of interacting with the polynucleotide and modifying at least one of the polynucleotide properties. The polynucleotide processing enzyme may or may not have enzyme activity, as long as the enzyme is bound to the polynucleotide and controls the translocation rate of the polynucleotide in the pore. The nucleic acid may be bound to one or more polynucleotide processing enzymes.

Preferably, the polynucleotide processing enzyme is soluble ribozyme. Further preferably, the polynucleotide processing enzyme includes but is not limited to nucleic acid binding protein, helicase, polymerase, reverse transcriptase, translocase, exonuclease, telomerase or topoisomerase.

In one specific implementation of the present invention, the polynucleotide processing enzyme is gyrase.

Preferably, the step (a) also includes a step of contacting the target polynucleotide with one or a combination of two or more of nucleic acid binding protein, helicase, polymerase, reverse transcriptase, translocase, exonuclease, telomerase and/or topoisomerase, which makes the translocation speed of the target polynucleotide sequence passes through the porin less than the translocation speed in the absence of the nucleic acid binding protein, helicase, polymerase, reverse transcriptase, translocase, exonuclease, telomerase and/or topoisomerase.

Further preferably, the nucleic acid binding protein includes but is not limited to one or a combination of two or more of modified or wild-type eukaryotic single-stranded binding protein, bacterial single-stranded binding protein, archaeal single-stranded binding protein, viral single-stranded binding protein or double-stranded binding protein. The nucleic acid binding protein includes but is not limited to SSBEco from *Escherichia coli*, SSBBhe from *Bartonella henselae*, SSBCbu from *Coxiella burnetii*, SSBTma from *Thermathoga maritima*, SSBHpy from *Helicobacter pylori*, SSBDra from Deinococcus radiodurans, SSBTaq from *Thermus aquaticus*, SSBMsm from *Mycobacterium smegmatis*, SSBSso from *Sulfolobus solfataricus*, SSBSso7D from *Sulfolobus solfataricus*, SSBMHsmt from *Homo sapiens*, SSBMle from *Mycobacterium leprae*, gp32T4 from Bacteriohage T4, gp32RB69 from Bacteriophage RB69 or gp2.5T7 from Bacteriohage T7.

Further preferably, the helicase may be any one of Hel308 family helicase and modified Hel308 family helicase, RecD helicase and its variants, TrwC helicase and its variants, Dda helicase and its variants, TraI Eco and its variants, or XPD Mbu and its variants.

Further preferably, the polymerase includes but is not limited to modified or wild-type DNA polymerase, including but not limited to Phi29 DNA polymerase, Tts DNA polymerase, M2DNA polymerase, VENT DNA polymerase, T5DNA polymerase, PRD1DNA polymerase, Bst DNA polymerase or REPLI-gscDNA polymerase.

Further preferably, the exonuclease includes but is not limited to modified or wild-type exonuclease I from *Escherichia coli*, exonuclease III from *Escherichia coli*, exonuclease from phageλor RecJ from *Thermus thermophilus*.

In one specific implementation of the present invention, the step (a) includes a step of contacting the target polynucleotide with the helicase, the helicase is EF8813, the amino acid sequence of the helicase is shown in SEQ ID NO: 3, and the nucleotide sequence of the helicase is shown in SEQ ID NO: 4. Preferably, the target polynucleotide may be contacted with one or more helicases. Further preferably, the target polynucleotide may be contacted with 2-20 helicases or even more helicases. The helicases that binds to the target polynucleotide may be identical or different. The multiple helicases binding to the target polynucleotide are covalently linked to each other.

Preferably, the one or more characteristics are selected from the source, length, size, molecular weight, identity, sequence, secondary structure and concentration of the target polynucleotide or whether the target polynucleotide is modified.

In one specific implementation of the present invention, the characteristic is a sequence.

Preferably, the one or more characteristics in the step (b) are carried out by electrical measurement and/or optical measurement.

Further preferably, electrical signals and/or optical signals are generated by the electrical measurement and/or optical measurements, and each nucleotide corresponds to a signal level, and then the electrical signals and/or optical signals are converted into nucleotide sequence characteristics.

The electrical measurement of the present invention is selected from current measurement, impedance measurement, field effect transistor (FET) measurement, tunnel measurement or wind tunnel measurement.

The electrical signal of the present invention is selected from current, voltage, tunneling, resistance, potential, conductivity or a measured value of transverse electric measurement.

In one specific implementation of the present invention, the electrical signal is the current passing through the pore. That is, the current passes through the pore in a nucleotide-specific manner, and if a nucleotide-related characteristic current is detected to flow through the pore, the nucleotide is present, and vice versa, the nucleotide is not present. However, the distinction between similar nucleotides or modified nucleotides is determined by the magnitude of the current.

Preferably, conductivity generated in the process of characterizing the polynucleotide with the porin of the present invention is higher than that of the pore formed by the wild-type Mnep monomer.

Preferably, the method also includes a step of applying a potential difference across the porin contacted with the target polynucleotide, wherein the potential difference is sufficient to translocate the target polynucleotide from a porin channel.

Preferably, the target polynucleotide may be natural DNA, RNA or modified DNA or RNA.

The target polynucleotide of the present invention is a macromolecule including one or more nucleotides.

The target polynucleotide of the present invention may be natural or artificially synthesized. Preferably, one or more nucleotides in the target polynucleotide may be modified, for example, methylated, oxidized, damaged, abasic, protein-labeled, with tagging nucleotide or a spacer linked in the middle of the polynucleotide sequence. Preferably, the artificially synthesized nucleic acid is selected from peptide nucleic acid (PNA), glycerol nucleic acid (GNA), threose nucleic acid (TNA), locked nucleic acid (LNA) or other synthetic polymers with nucleoside side chains.

Preferably, the porin allows hydrated ions to flow from one side of a membrane to another layer of the membrane under the drive of an applied potential, wherein the membrane may form a barrier for the flow of ions, nucleotides and nucleic acids. Further preferably, the membrane is a bilayer membrane, further preferably a lipid bilayer membrane. The lipid bilayer membrane includes but is not limited to one or a mixture of two or more of phospholipid, glycolipid, cholesterol and mycolic acid.

Preferably, the porin channel is located between a first conductive liquid medium and a second conductive liquid medium, wherein at least one conductive liquid medium includes the target polynucleotide, and the first conductive liquid medium and the second conductive liquid medium may be identical or different, as long as the purpose of analyzing one or more characteristics of the target polynucleotide may be achieved.

Preferably, the target polynucleotide is single-stranded, double-stranded or at least partially double-stranded.

In one specific implementation of the present invention, the target polynucleotide is at least partially double-stranded, wherein the double-stranded part constitutes a Y-adaptor structure, the Y-adaptor structure includes a leader sequence that is preferentially screwed into the porin, and a 3' terminal of the leader sequence is attached to mercaptan, biotin or cholesterol for binding to a layer of the lipid bilayer membrane to point the target polynucleotide in a right direction and give a pulling effect.

In one specific implementation of the present invention, the 3' terminal of the leader sequence is attached to cholesterol for binding to a layer of the lipid bilayer membrane.

The degree of differentiation of different nucleotides in the characterization of the target polynucleotide by the porin of the present invention may be controlled by regulating the voltage, salt concentration, buffer, additive or temperature in the characterization of the target polynucleotide. The additive is selected from DTT, urea or betaine.

Preferably, the voltage ranges is from −250 mV to +250 mV. Further preferably, the voltage is selected from −250 mV, −210 mV, −180 mV, −140 mV, −110 mV, −90 mV, −70 mV, −40 mV, 0 mV, +40 mV, +70 mV, +90 mV, +110 mV, +140 mV, +180 mV, +210 mV or +250 mV.

In one specific implementation of the present invention, the voltage is from −180 mV to +180 mV.

In one specific implementation of the present invention, the method includes inserting the porin into the membrane, and then contacting the target polynucleotide with the porin, nucleic acid binding protein, polymerase, reverse transcriptase, translocase, exonuclease, topoisomerase, telomerase or helicase, and applying a potential difference across the porin contacted with the target polynucleotide so that the target polynucleotide sequence passes through the porin; and obtaining current characteristics of an interaction between the nucleotide and the porin when the target polynucleotide passes through the porin to identify whether the polynucleotide is present, which nucleotide is the polynucleotide or whether the polynucleotide is modified.

Preferably, the method of inserting the porin into the membrane may be any method known in the art to achieve the purpose of characterizing polynucleotides. Further preferably, the porin may be suspended in a purified form in a solution including a lipid bilayer, so that the porin diffuses into the lipid bilayer and is inserted into the lipid bilayer by binding to the lipid bilayer and assembling into a functional state.

An eleventh aspect of the present invention provides an application in characterization of a target polynucleotide of the Mnep monomer variant, the construct, the nucleotide sequence, the vector, the cell or the porin.

A twelfth aspect of the present invention provides a kit for characterizing a target polynucleotide, and the kit includes the Mnep monomer variant, the construct, the nucleotide sequence, the vector, the cell or the porin.

Preferably, the Mnep monomer variant, the construct, the nucleotide sequence, the vector, the cell or the porin may be multiple.

Preferably, the kit also includes one or a combination of two or more of one or more nucleic acid binding proteins, reverse transcriptase, translocase, exonuclease, topoisomerase, helicase, telomerase or polymerase.

Preferably, the kit also includes a chip of a lipid bilayer, and the porin spans across the lipid bilayer.

Preferably, the kit includes one or more lipid bilayers, each of which includes one or more porins.

Preferably, the kit also includes a reagent or apparatus for implementing characterization of the target polynucleotide. Further preferably, the reagent includes a buffer and tools required for PCR amplification.

A thirteenth aspect of the present invention provides an apparatus for characterizing a target polynucleotide, and the apparatus includes the Mnep monomer variant, the construct, the nucleotide sequence, the vector, the cell or the porin.

Preferably, the apparatus also includes one or a combination of two or more of one or more nucleic acid binding proteins, reverse transcriptase, translocase, exonuclease, topoisomerase, helicase, telomerase or polymerase.

Preferably, the apparatus also includes a sensor supporting the porin and transmitting signals that the porin interacts with the polynucleotide, at least one memory for storing the target polynucleotide, and a solution required for implementation of the characterization process.

Preferably, the apparatus also includes a patch clamp amplifier and/or a data acquisition device.

A fourteenth aspect of the present invention provides a sensor for characterizing a target polynucleotide, and the sensor includes the Mnep monomer variant, the construct, the nucleotide sequence, the vector, the cell or the porin.

The "non-natural amino acid" of the present invention is compounds which are not found naturally in proteins and include amino and carboxyl groups. Preferably, the non-natural amino acids are any non-natural amino acids known in the art. Further preferably, the non-natural amino acids include but are not limited to N-ethyl aspartyl, hydroxylysine, 3-hydroxyproline, 2-aminobutyric acid, 0-alanine, j-amino propionic acid, 2-aminoadipic acid, 3-aminoadipic acid, 4-aminobutyric acid, 6-aminocaproic acid, 2-aminoheptanic acid, allo-isoleucine, isochainlysine, 4-hydroxyproline, allo-hydroxylysine, 2-aminoisobutyric acid, N-methylglycine, N-methy isoleucine, 3-aminoisobutyric acid, 6-N-methyllysine, 2,4-diaminobutyric acid, N-methylvaline, omithine, norleucine, norvaline, desmosine, 2,2'-diaminopimelic acid, 2,3-diaminopropionic acid, N-ethyl glycine or 2-amino heptanedioic, etc.

The "modified . . . amino acid" of the present invention is an amino acid which the side chain is chemically modified, for example, a post-translationally modified amino acid, or an amino acid with a side chain including a novel functional group (e.g. sulfhydryl, amino or carboxyl) or with a side chain including a part that generates a signal (e.g. a fluorophore or radioactive label).

The "pore channel diameter of the narrow region" of the present invention refers to a diameter of a narrowest portion of a cross section of a pore inside the porin.

The "nucleotide" of the present invention includes but is not limited to adenosine monophosphate (AMP), guanosine monophosphate (GMP), thymidine monophosphate (TMP), uridine monophosphate (UMP), cytosine nucleoside monophosphate (CMP), cyclic adenosine monophosphate (cAMP), cyclic guanosine monophosphate (cGMP), deoxyadenosine monophosphate (dAMP), deoxyguanosine monophosphate (dGMP), deoxythymidine monophosphate (dTMP), deoxyuridine monophosphate (dUMP) and deoxycytidine monophosphate (dCMP). Preferably, the nucleotide is selected from AMP, TMP, GMP, CMP, UMP, dAMP, dTMP, dGMP or dCMP.

The "and/or" of the present invention includes an alternatively listed items and a combination of any number of items.

The "include/including", "contain" and "comprise" of the present invention is an open description, and contains the specified components or steps described, and other specified components or steps that will not have an affect substantially.

The "about" of the present invention is used to represent the value and the standard deviation allowed by the apparatus or method for measuring the value.

The "homology", "homolog" and "homologous" of the present invention refers to that in terms of use of a protein sequence or nucleotide sequence, those of ordinary skilled in the art may adjust the sequence according to the actual work needs, so that compared with the sequence obtained by the prior art, the sequence used has (including but not limited to) 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 70%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8% or 99.9% sequence identity.

The "Mnep monomer variant" of the present invention refers to a Mnep monomer variant that has at least or at most 70%, 75%, 80%, 85%, 90%, 91%, 92%, 93%, 94%, 95%, 96%, 97%, 98%, 99%, 99.5% or 99.9% or more, or any range there between, but less than 100% identity with the wild-type Mnep monomer, and retains a channel-forming ability when binding to one or more other Mnep monomer variants or wild-type Mnep monomers. Optionally, the Mnep monomer variant is further identified to include mutations in the portion of the sequence that promotes the formation of the narrow region of the fully formed channel-forming porin. The Mnep monomer variant may be, for example, a recombinant protein. The Mnep monomer variant may include any mutations described herein.

The "porin of the paralog or homolog of the Mnep monomer variant" of the present invention refers to a porin of the paralog or homolog of the Mnep monomer variant that has at least or at most 70%, 75%, 80%, 85%, 90%, 91%, 92%, 93%, 94%, 95%, 96%, 97%, 98%, 99%, 99.5% or 99.9% or more, or any range there between, but less than 100% identity with the porin of the paralog or homolog of the wild-type Mnep monomer, and retains the channel-forming ability. Optionally, the porin of the paralog or homolog of the Mnep monomer variant is further identified to include mutations in the portion of the sequence that promotes the formation of the narrow region of the fully formed channel-forming porin. The porin of the paralog or homolog of the Mnep monomer variant may be, for example, a recombinant protein. The porin of the paralog or homolog of any Mnep monomer variant may be optionally used for any implementation herein.

The "construct of the paralog or homolog of the Mnep monomer variant" of the present invention refers to a construct of the paralog or homolog of the Mnep monomer variant that has at least or at most 70%, 75%, 80%, 85%, 90%, 91%, 92%, 93%, 94%, 95%, 96%, 97%, 98%, 99%, 99.5% or 99.9% or more, or any range there between, but less than 100% identity with the construct of the paralog or homolog of the wild-type Mnep monomer, and retains the channel-forming ability. Optionally, the construct of the paralog or homolog of the Mnep monomer variant is further identified to include mutations in the portion of the sequence that promotes the formation of the narrow region of the fully formed channel-forming porin. The construct of the paralog or homolog of the Mnep monomer variant may be, for example, a recombinant protein. The construct of the paralog or homolog of any Mnep monomer variant may be optionally used for any implementation herein.

BRIEF DESCRIPTION OF THE DRAWINGS

Embodiments of the present invention are described in detail below with reference to the attached drawings, wherein.

DETAILED DESCRIPTION OF THE EMBODIMENTS

Figure 1:
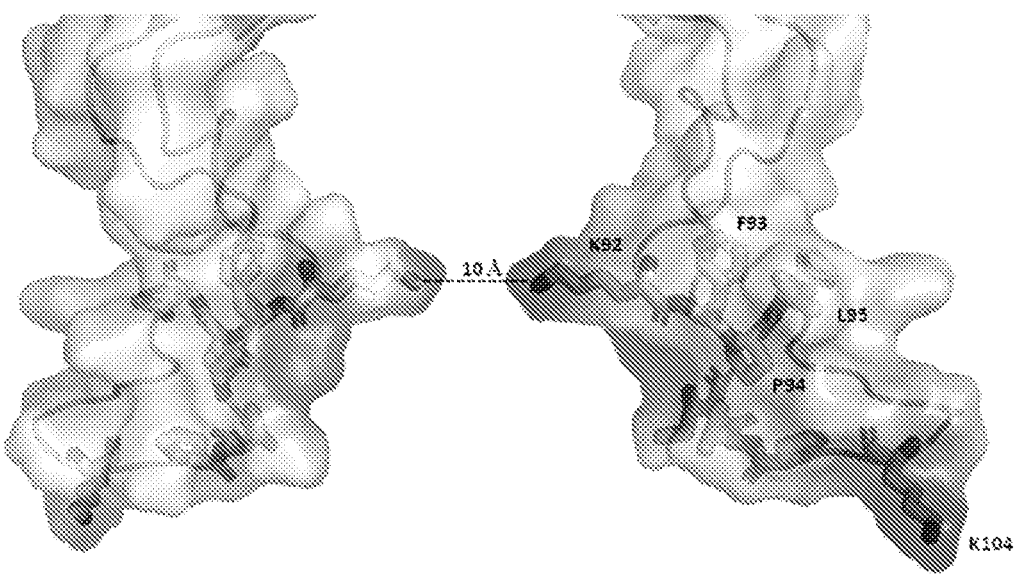
FIG. 1: a stick model of a nanopore (G92K/D93F/G95L/A104K) comprising a Mnep monomer variant, showing distribution characteristics of amino acids in a narrow region of the pore channel, with homology modeling completed by SWISS MODEL and a template pdb is 1 uun.

Technical solutions in the embodiments of the present invention are described clearly and completely below with reference to the attached drawings in the embodiments of the present invention. Apparently, the embodiments described are not all but only some of the embodiments of the present invention. Based on the embodiments of the present invention, other embodiments obtained by those of ordinary skill in the art without creative work shall fall into the protection scope of the present invention.

Embodiment 1 Preparation of Mnep Monomer Variant

I. Construction of Plasmid

A protein sequence of a Mnep monomer variant was optimized by codons of corresponding amino acids, and suitable restriction endonuclease sites were added at both ends of a gene. Specifically, a NcoI site ccatgg was added at a 5' terminal, and an xhoI site ctcgag was added at a 3' terminal. Then the gene was synthesized, and the synthesized gene was cloned into an expression vector pET24b.

II. Preparing a Nucleotide Sequence of the Mnep Monomer Variant by Site-Directed Mutagenesis of a Target Gene A mutant gene was induced (a PCR reaction) to perform PCR amplification with designed primers and KOD plus high-fidelity enzyme by using a plasmid to be mutated as a template, thus inducing mutation of the target gene.

The Specific Steps are as Follows:
1. Point mutation primers were designed, and template plasmid DNA (including plasmid DNA of SEQ ID NO: 2) was prepared and amplified with a 50p PCR reaction system. A DH5u strain was used as host bacterium. In an end+ type strain, the clone number is often low, but the mutation efficiency is not affected. Wherein, a QIGEN plasmid purification kit was used to extract the template plasmid DNA.

Point Mutation Primers:

SEQ ID NO: 16
CCACCCCGAATGTGGCACTGAGTAAATTTCCGCTGTTTGGCATTACCGG
CATTGGCGGCAAACTGCCGGTGATTGGCGAAATTG

SEQ ID NO: 17
CAATTTCGCCAATCACCGGCAGTTTGCCGCCAATGCCGGTAATGCCAAA
CAGCGGAAATTTACTCAGTGCCACATTCGGGGTGG

50 µL PCR Reaction System:

| | |
|---|---|
| 10 × KOD plus Buffer | 5 µL |
| Template plasmid DNA 60 ng | 2 µL |
| Forward primer (20 pmol/µL) | 2 µL |
| Reverse primer (20 pmol/µL) | 2 µL |
| dNTP mixture (each 2.5 mM) | 2 µL |
| MgSO$_4$ | 2.5 µL |
| KOD plus enzyme | 1 µL |
| ddH$_2$O | 33.5 µL |

PCR Amplification Reaction
Cycles, Temperature and Reaction Time:

| | | |
|---|---|---|
| 1 cycle | 95° C. | 5 min |
| 18 cycles | 95° C. | 30 s |
| | 72° C. | 30 s 6 min |
| | 55° C. | 30 min |
| 1 cycle | 72° C. | 10 min |

After the PCR amplification reaction is completed, the nucleotide sequence of the Mnep monomer variant (SEQ ID NO: 11) was obtained. A resulting product was kept in an ice bath for 5 min, and then kept at room temperature (to avoid repeated freezing and thawing).

2. Extracting Mnep Monomer Variant Gene by Template Digestion

After the PCR reaction is finished, a methylated plasmid was digested with DpnI enzyme to select mutant plasmid DNA (a plasmid including SEQ ID NO: 11). A PCR reaction product was prepared specifically by adding 1 µL (10 U/µL) of DpnI enzyme and incubating at 37° C. for 2 hours. (When the amount of plasmid DNA is too much, the DpnI enzyme may react incompletely with the sample. If the mutation rate is low, the reaction time may be appropriately prolonged or the amount of the DpnI enzyme may be increased)

3. Obtaining a Strain Containing the Mnep Monomer Variant Gene by Transformation After the reaction, a gap was formed in the plasmid DNA. Therefore, when the plasmid DNA was transferred into E. coli, DH5a was selected specifically by the following steps: adding 4 µL of a mutant plasmid DNA sample to 50 µL of DH5u competent cells, and then keeping on ice for 30 min, thermal shocking at 42° C. for 90 seconds, then immediately keeping in an ice bath for 2 min, adding 500 µL of an SOC medium, culturing at 37° C. for 1 hour, and finally taked 100 µL bacterial solution to coat the a resistance screening plate.

4. Sequencing Validation

Picked four transformants for culturing and sequencing, and positive transformants with correct mutation were selected to extract plasmids to be stored for standby application.

III. Preparation of the Mnep Monomer Variant

The Mnep monomer variant plasmid validated by sequencing correctly was transferred into BL21(DE3) for culture. Then the protein was purified, wherein the formulae of the reagents for protein purification are shown in Table 1.

Pipetted 12 µL of Mnep-K0 BL21 (DE3) glycerol bacteria into 12 mL (1:1000) fresh LB medium with a final concentration of 50 mg/mL kanamycin, 37° C. and 200 rpm shaked overnight for activation, and amplification culture was performed according to an inoculation amount of 1% to a 2L LB medium with a final concentration of 50 mg/mL kanamycin on the next day. After culturing at 37° C. and 220 rpm to OD600=0.6-0.8, the resulting solution was kept in an ice bath for rapid cooling, and then isopropyl thiogalactoside (IPTG) with a final concentration of 1 mM was added to the culture system, and expression was induced overnight at 18° C. and 220 rpm.

The bacteria were collected by centrifugation at 6000 rpm and 4° C. for 15 min on the next day. The bacteria were resuspended at a ratio of bacteria: lysis buffer=1:10 (m/v), then a mixed protease inhibitor was added, and high pressure crushed was carried out until the bacterial solution became clear.

1% OPOE (octylphenol polyoxyethylene ether) and 0.1% FC12 (N-dodecylphosphorylcholine) were added and stirred at room temperature for solubilization for 1-2 hours. The solubilized lysis products were treated in a boiling water bath for 20 min, and then kept in an ice bath for 60 min immediately. After that, PEI (polyetherimide) with a final concentration of 0.3% was added. After thorough mixing, the resulting solution was kept on ice for 5 min, and centrifuged at 4° C. and 14000 rpm for 30 min, and the supernatant was collected.

Figure 5:
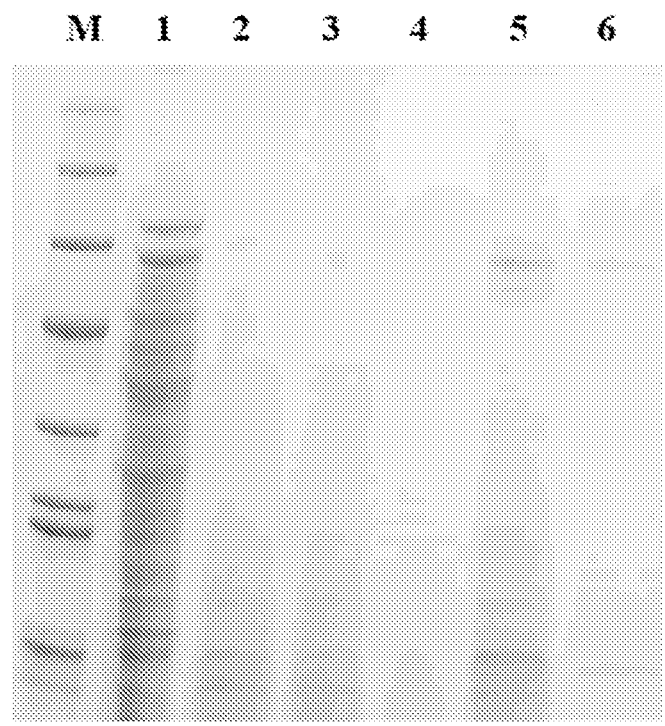
FIG. 5: a purification result of Mnep-(G92K/D93F/G95L/A104K) monomer variant protein by anion exchange column chromatography, in which a first lane is a broken whole cell lysate, a second lane is a supernatant of the whole cell lysate after centrifugation, a third lane is a penetrating component of the anion exchange column, and fourth, fifth and sixth lanes are three eluting peaks of NaCl linear elution, and the results show that the second eluting peak (a result shown in a fifth lane) contains the highest amount of target protein.

The supernatant was filtered by a 0.45 µm filter membrane and purified by an anion exchange column. The ion column was pre-equilibrated with a Buffer B. The supernatant flowed through the column at a flow rate of 5 mL/min, and then miscellaneous proteins were eluted with the Buffer B. At last, buffer C: 0-1M salt concentration was used for linear gradient elution, and the eluted components were collected. The results of purification by the anion exchange column are shown in FIG. 5.

Figure 6:
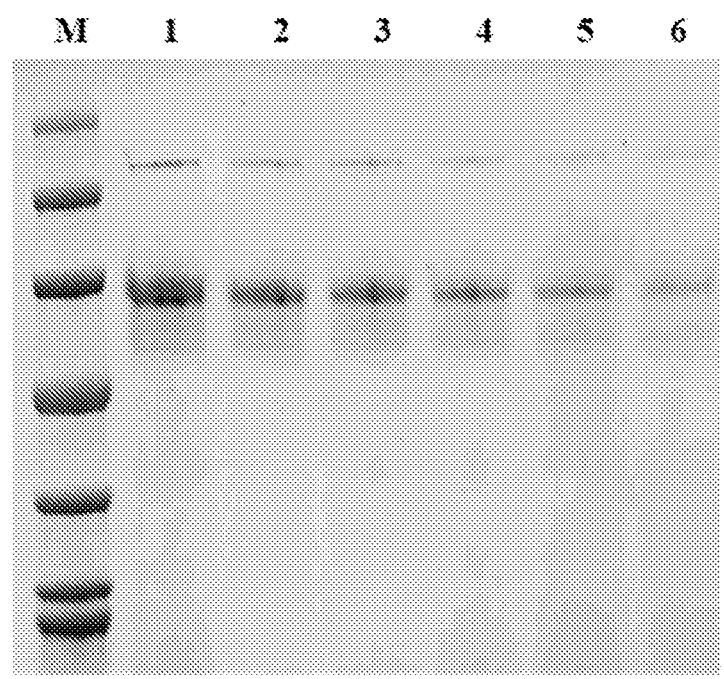
FIG. 6: a purification result of Mnep-(G92K/D93F/G95L/A104K) monomer variant protein by molecular sieve exclusion chromatography, in which the first to sixth lanes show the electrophoresis results of different components collected from the molecular sieve.

The eluted sample collected was concentrated in a 100 kDa ultrafiltration tube, and centrifuged at 4° C. and 14000 rpm for 20 min, and the supernatant was retained; a proper amount of the concentrated supernatant was subjected to molecular exclusion chromatography. The chromatographic column were equilibrated with SEC Buffer of the two column volumes in advance. The sample was loaded, concentrated and detected by SDS-PAGE gel electrophoresis. The results of molecular exclusion chromatography are shown in FIG. 6.

TABLE 1

| Formulae of reagents for protein purification | |
|---|---|
| Reagent name | Component |
| Lysis buffer | 50 mM Tris-HCl 8.0 |
| | 150 mM NaCl |
| | 10% glycerol |
| Buffer B | 25 mM HEPES-Na 7.5 |
| | 0.5% OPOE |

TABLE 1-continued

Formulae of reagents for protein purification

| Reagent name | Component |
|---|---|
| Buffer C | 25 mM HEPES-Na 7.5<br>1M NaCl<br>0.5% OPOE |
| SEC buffer | 25 mM HEPES-Na 7.5<br>150 mM NaCl<br>0.5% OPOE |

Embodiment 2 Preparation of Porin

1. Pipetted 12 μL of Mnep-K0 BL21 (DE3) glycerol bacteria into 12 mL (1:1000) fresh LB medium with a final concentration of 50 mg/mL kanamycin, 37° C. and 200 rpm shaked overnight for activation, and amplification culture was performed according to an inoculation amount of 1% to a 2L LB medium with a final concentration of 50 mg/mL kanamycin on the next day. After culturing at 37° C. and 220 rpm to $OD_{600}$=0.6-0.8, the resulting solution was kept in an ice bath for rapid cooling, and then IPTG with a final concentration of 1 mM was added to the culture system, and expression was induced overnight at 18° C. and 220 rpm.

2. The bacteria were collected by centrifugation at 6000 rpm and 4° C. for 15 min on the next day. The bacteria were resuspended at a ratio of bacteria: lysis buffer=1:10 (m/v), then a mixed protease inhibitor was added, and high pressure crushed was carried out until the bacterial solution became clear.

3. 1% OPOE and 0.1% FC12 were added and stirred at room temperature for solubilization for 1-2 hours.

4. The solubilized lysis products were treated in a boiling water bath for 20 min, and then kept in an ice bath for 60 min immediately. After that, PEI with a final concentration of 0.3% was added. After thorough mixing, the resulting solution was kept on ice for 5 min, and centrifuged at 4° C. and 14000 rpm for 30 min, and the supernatant was collected.

5. The supernatant was filtered by a 0.45 μm filter membrane and purified by an anion exchange column. The ion column was pre-equilibrated with a Buffer B. The supernatant flowed through the column at a flow rate of 5 mL/min, and then miscellaneous proteins were eluted with a Buffer B. At last, buffer C: 0-1M salt concentration was used for linear gradient elution, and the eluted components were collected.

6. The eluted sample collected was concentrated in a 100 kDa ultrafiltration tube, and centrifuged at 4° C. and 14000 rpm for 20 min, and the supernatant was retained; a proper amount of the concentrated supernatant was subjected to molecular exclusion chromatography. The chromatographic column were equilibrated with SEC Buffer of the two column volumes in advance. The sample was loaded, concentrated and detected by SDS-PAGE gel electrophoresis.

Embodiment 3 Application of Porin in Sequencing

A single nanopore was inserted into a phospholipid bilayer in a buffer (400 mM KCl, 10 mM HEPES pH 8.0, 50 mM $MgCl_2$), and electrical measurement values were obtained from the single nanopore.
The Specific Steps are as Follows:
After inserting a single porin (a Mnep-K0 nanopore, a stick model shown in FIG. 1) of SEQ ID NO:1 with an amino acid sequence of G92K/D93F/G95L/A104K mutation into the phospholipid bilayer, the buffer (400 mM KCl, 10 mM HEPES pH 8.0, 50 mM $MgCl_2$) flowed through the system to remove any excess Mnep-K0 nanopores. A DNA construct X2& cX2-80-15 or SIT & S1MC (a final concentration of 1-2 nM) was added to the Mnep-K0 nanopore experimental system. After thorough mixing, the buffer (400 mM KCl, 10 mM HEPES pH 8.0, 50 mM $MgCl_2$) flowed through the system to remove any excess DNA construct X2& cX2-80-15 or SIT & S1MC. Then, a premix of helicase (EF8813-1, a final concentration of 15 nM) and a fuel (ATP, a final concentration of 3 mM) was added to the single Mnep-K0 nanopore experimental system, and the sequencing of a Mnep-K0 porin was monitored at +180 mV.

Figure 2:
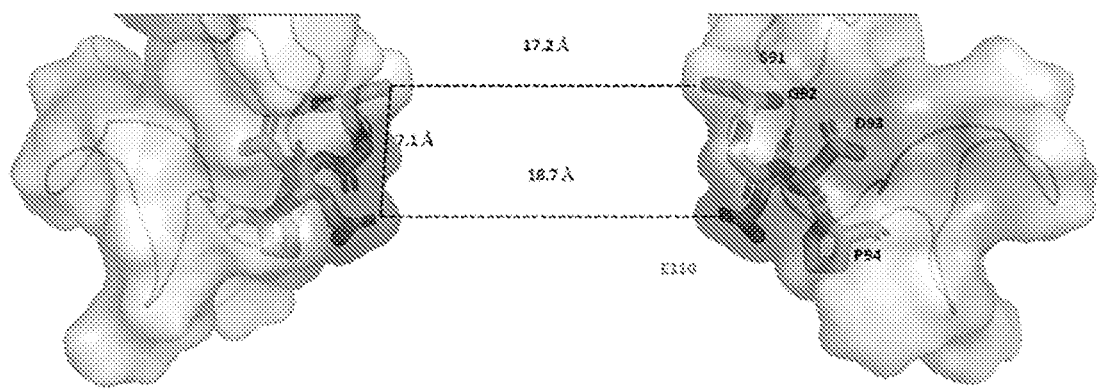
FIG. 2: a stick model of a wild-type Mnep nanopore, showing distribution characteristics of amino acids in a narrow region of the pore channel, with homology modeling completed by SWISS MODEL and a template pdb is 1 uun.

The same steps were performed in the control group except that the Mnep-K0 nanopore was replaced with a wild-type Mnep nanopore (the stick-surface potential model is shown in FIG. 2). Wherein, the stick model of the wild-type Mnep nanopore shows distribution characteristics of amino acids in a narrow region of the pore channel. The critical amino acid residues in the narrow region of the pore channel mainly include serine at position 91, glycine at position 92, aspartic at position 93 and glutamic at position 110 in a loop region. A diameter of narrow regions formed by S91 and E110 was 17.2 Å and 18.7 Å, respectively. Compared with that of the wild-type Mnep nanopore, the stick-surface potential model of the nanopore including the Mnep monomer variant (the stick-surface potential model is shown in FIG. 1) showed the distribution characteristics of amino acids in the narrow region of the mutant pore channel, in which the distribution of the critical amino acid residues in the narrow region of the mutant pore channel pointed to lysine at position 92 of the amino acid residue in the center of the pore channel, and diameter of pore channel was about 10A. The side chains of phenylalanine at position 93 and leucine at position 95 swung to the outside of the pore channel, and participated in enhancement of hydrophobic accumulation force in the narrow region of the pore channel. Lysine at position 104 may be closely related to correct assembly of a channel complex.

Figure 3:
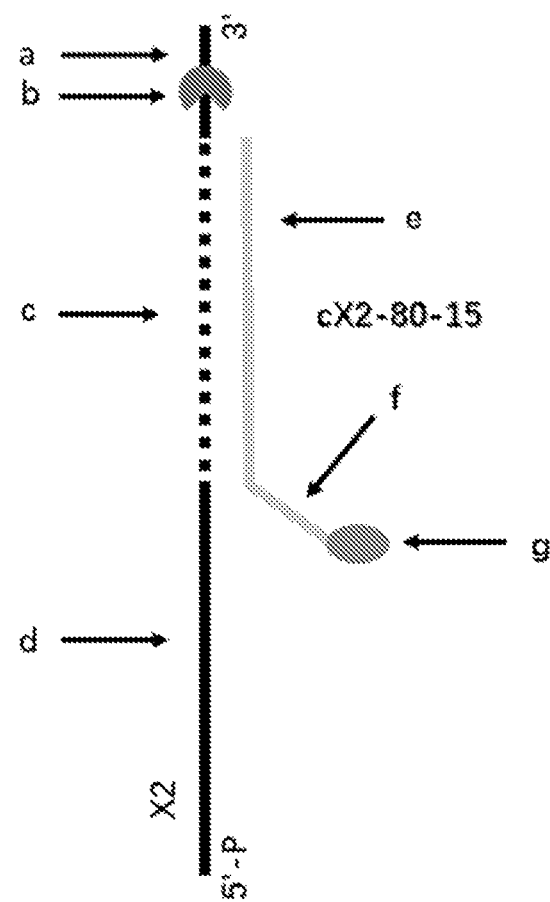
FIG. 3: a structure diagram of a DNA construct X2&cX2-80-15 to be tested, in which a segment a corresponds to SEQ ID NO: 7, a segment b corresponds to helicase EF8813-1 (including a N terminal histidine tag and a variant protein of fused with a TOPV-HI domain, SEQ ID NO: 3-4), the helicase may bind to the segment tagged as a, a segment c corresponds to SEQ ID NO: 6, a segment d corresponds to SEQ ID NO: 5, a segment e corresponds to SEQ ID NO: 8, 45 bases at the 5' terminal of cX2-80-15 are complementary to the segment c of a test chain for pairing, and a 3' terminal of cX2-80-15 contains 40 thymines and 3' cholesterol TEG marker corresponding to a segment g, and a segment f corresponds to SEQ ID NO: 9.

The specific sequences of X2& cX2-80-15 (a specific structure is shown in FIG. 3) are as follows:

X2:

(SEQ ID NO: 5)
TGGTTTTTGTTTGTTTTTAGAATTTTTTTACACTACCACTGCTAGCATT
TTTCA (SEQ ID NO: 6)
TTTCTCACTATCCCGTTCTCATTGGTGCACCATCTTTTTTTGGTT (SEQ ID NO: 7)
TTTTTGCAGCAGCAT cX2-80-15:

(SEQ ID NO: 8)
AACCAAAAAAAGATGGTGCACCAATGAGAACGGGATAGTGAGAAA (SEQ ID NO: 9)
TTTTTTTTTTTTTTTTTTTTTTTTTTTTTTTTT

Figure 4:
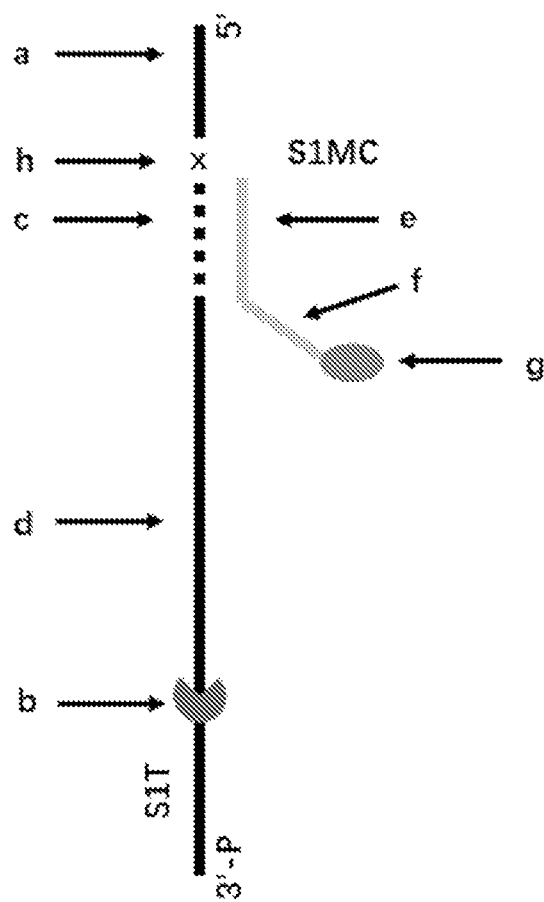
FIG. 4: a structure diagram of a DNA construct S1T&S1MC to be tested, in which a segment a corresponds to SEQ ID NO: 10, a segment b corresponds to helicase EF8813-1 (including a N terminal histidine tag and a variant protein of fused with a TOPV-HI domain, SEQ ID NO: 3-4), the helicase may bind to the segment tagged as a, a segment h refers to dspacer that only retains the phosphoric acid skeleton and is labeled as x, a segment c corresponds to SEQ ID NO: 12, a segment d corresponds to SEQ ID NO: 13, a segment e corresponds to SEQ ID NO: 14, 45 bases at a 5' terminal of S1MC are complementary to the segment c of a test chain for pairing, and a 3' terminal of S1MC contains 20 thymines and a 3' cholesterol TEG marker corresponding to a segment g, and a segment f corresponds to SEQ ID NO: 15.

The specific sequences of S1T & S1MC (a specific structure is shown in FIG. 4) are as follows:
S1T:

(SEQ ID NO: 10)
TTTTTTTTTTTTTCCTTCC

X (a segment h)

(SEQ ID NO: 12)
TTCTTTTCCCGTCCGCTCGT

-continued (SEQ ID NO: 13)
TCGCGCCTGTCTGCTTGTTTTTTTTTTCTTTTTTTTTTTCTCACTATC
GCATTCTCATGCAGGTCGGTGGTCGCAGTA

S1MC:

(SEQ ID NO: 14)
ACGAGCGGACGGGAAAAGAA (SEQ ID NO: 15)
TTTTTTTTTTTTTTTTTTTT

Figure 7:
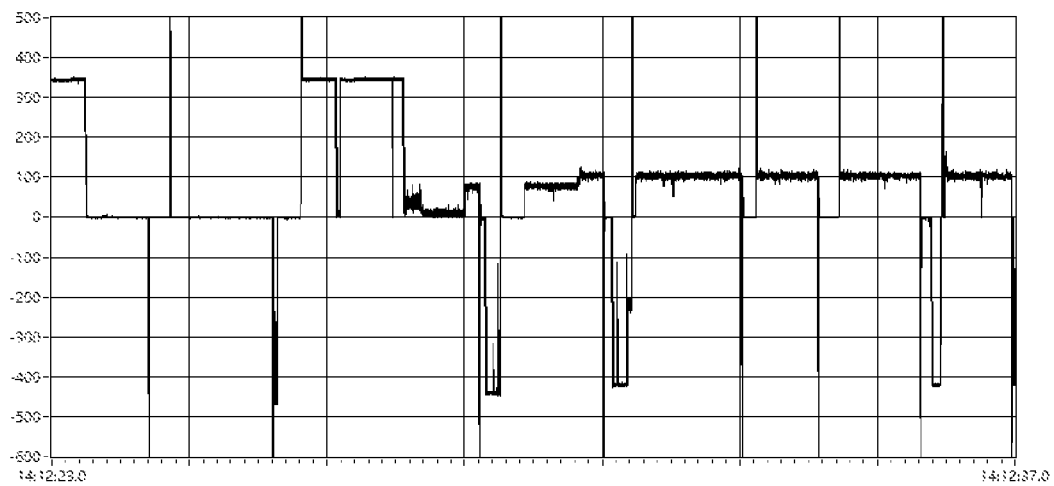
FIG. 7: single channel behavior characteristics of a wild-type Mnep monomer pore channel at +180 mV, wherein y-axis coordinate=current (pA) and x-axis coordinate=time (s).

The sequencing results are shown in FIGS. 7-12, wherein FIG. 7 shows the single channel behavior characteristics of the wild-type Mnep nanopore channel at +180 mV. In the test system, the wild-type channel has a full open current of about 347 pA at +180 mV, obvious gating and obvious voltage dependence. The full open current was higher at −180 mV, close to −450 pA, and the gating was stronger. Apparently, the wild-type channel cannot meet the requirements of nanoporin and cannot accomplish the sequencing purpose.

Figure 8:
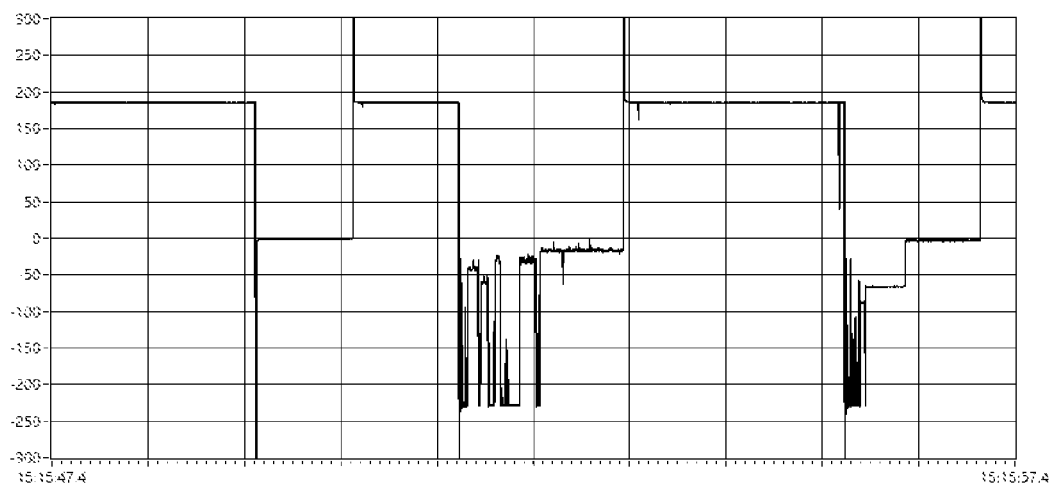
FIG. 8: open-pore current and gating characteristics of a Mnep-(G92K/D93F/G95L/A104K) monomer variant at +180 mV, 0 mV and −180 mV, wherein y-axis coordinate=current (pA) and x-axis coordinate=time (s).
Figure 9:
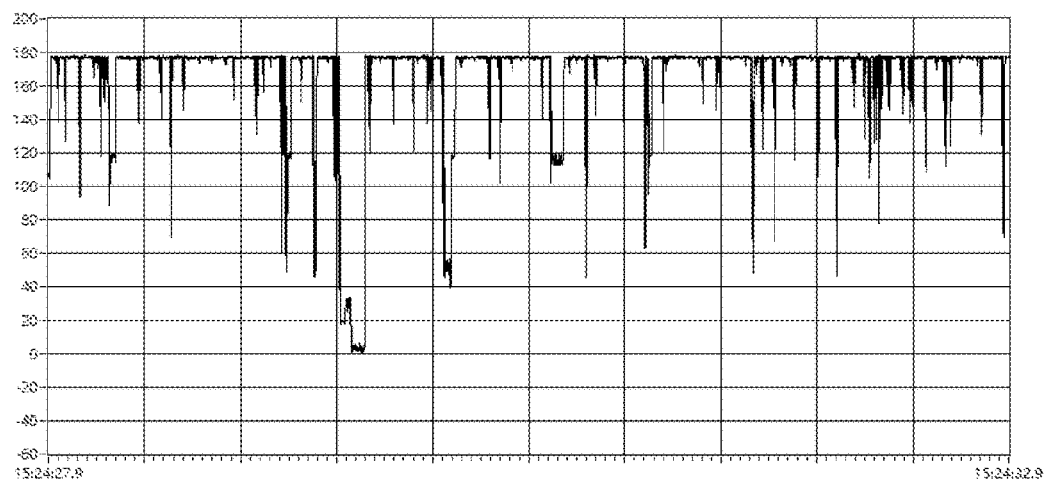
FIG. 9: a signal of nucleic acid passing through a nanopore (Mnep-(G92K/D93F/G95L/A104K) including a Mnep monomer variant at +180 mV, wherein y-axis coordinate=current (pA) and x-axis coordinate=time (s).

FIG. 8 shows the open-pore current and gating characteristics of the Mnep-(G92K/D93F/G95L/A104K) monomer variant at +180 mV, 0 mV and −180 mV. The results showed that the forward gating of the mutant channel disappeared. In the test system, the full open current was about 180 pA at +180 mV, and the gating was stronger at a negative voltage. FIG. 9 shows the signal of nucleic acid passing through the nanopore Mnep-(G92K/D93F/G95L/A104K) at +180 mV.

Figure 10A:
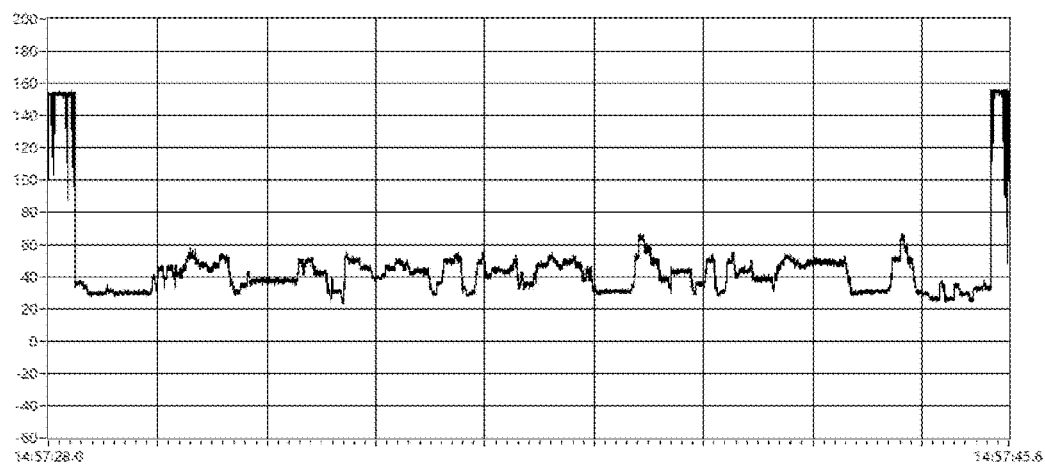
FIG. 10A: example current trajectories when helicase (EF8813-1) controls a DNA construct X2&cX2-80-15 to translocate through a nanopore including a Mnep-(G92K/D93F/G95L/A104K) monomer variant, wherein y-axis coordinate of two trajectories=current (pA) and x-axis coordinate=time (s)
Figure 10B:
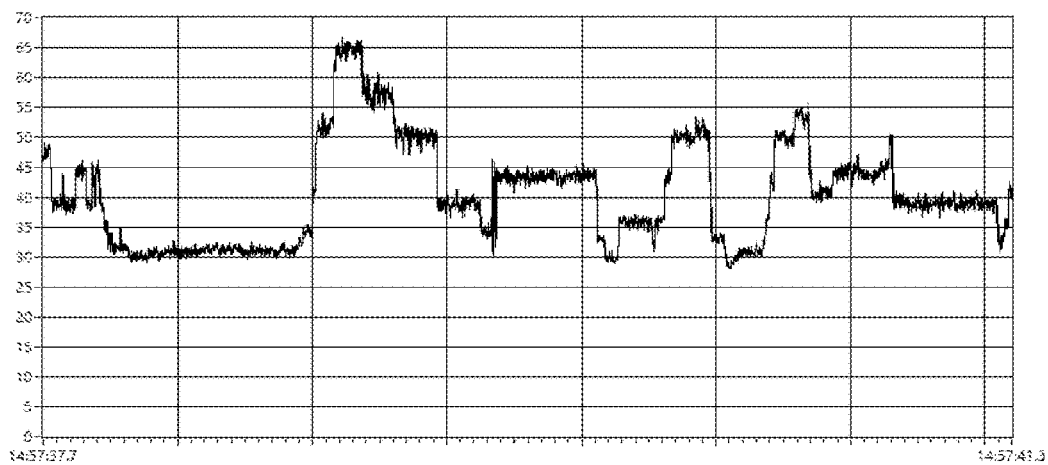
FIG. 10B and FIG. 10C show amplification results of the current trajectories in some areas of FIG. 10A.
Figure 10C:
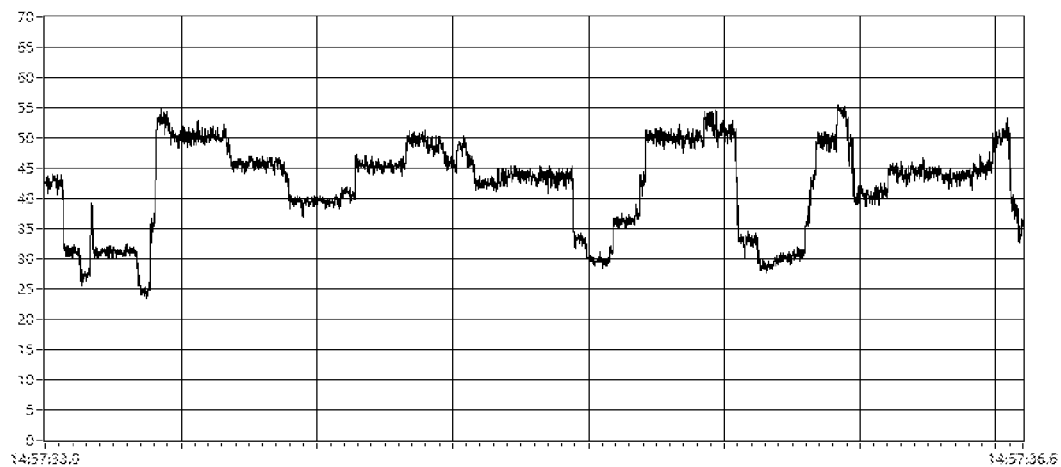
Figure 11A:
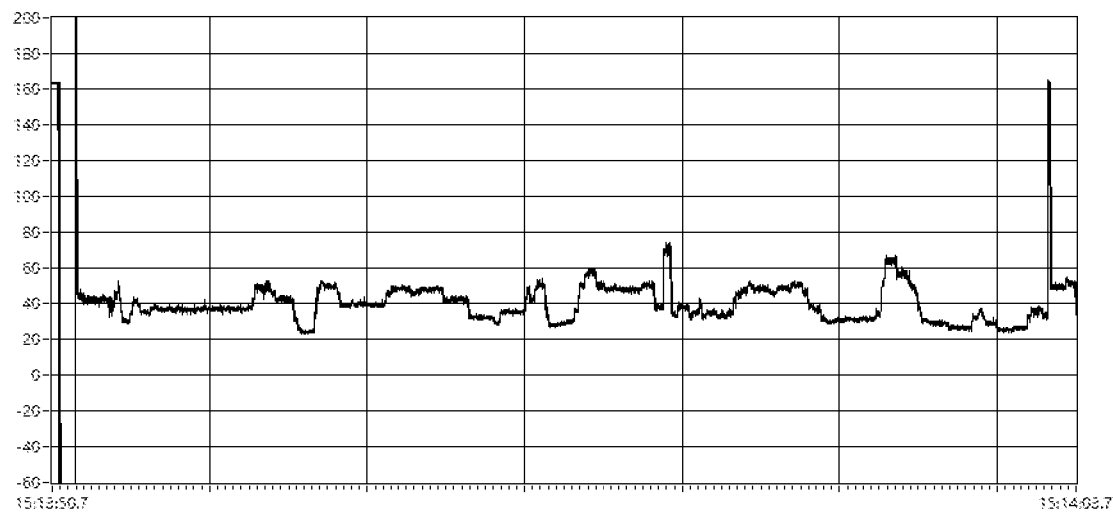
FIG. 11A, 11B, 11C, 11D, 11E and 11F: are the results of different segments of the example current trajectories respectively when the helicase (EF8813-1) controls the DNA construct X2&cX2-80-15 to translocate through the nanopore including the Mnep-(G92K/D93F/G95L/A104K) monomer variant, wherein y-axis coordinates of the two trajectories=current (pA) and x-axis coordinates=time (s).
Figure 11B:
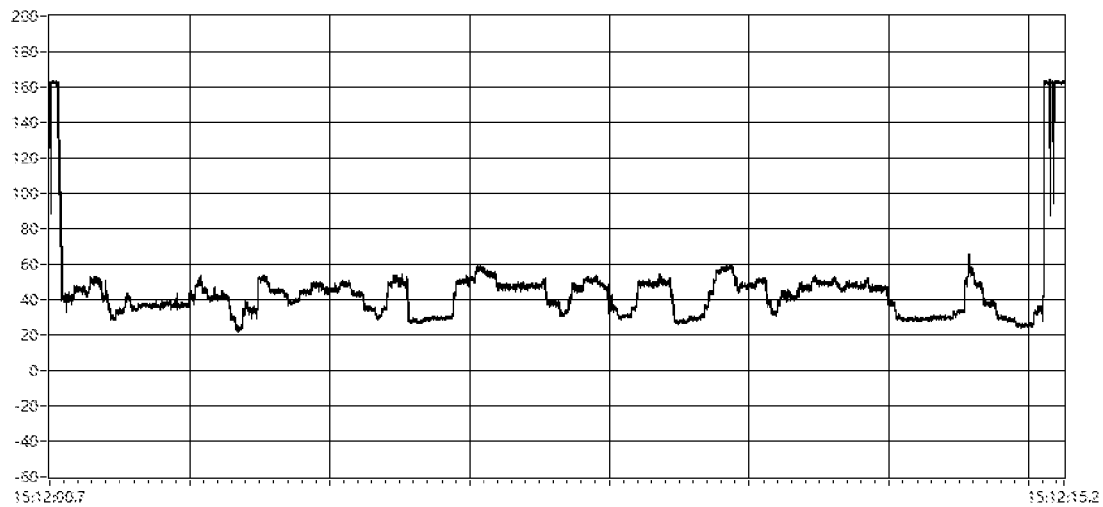
Figure 11C:
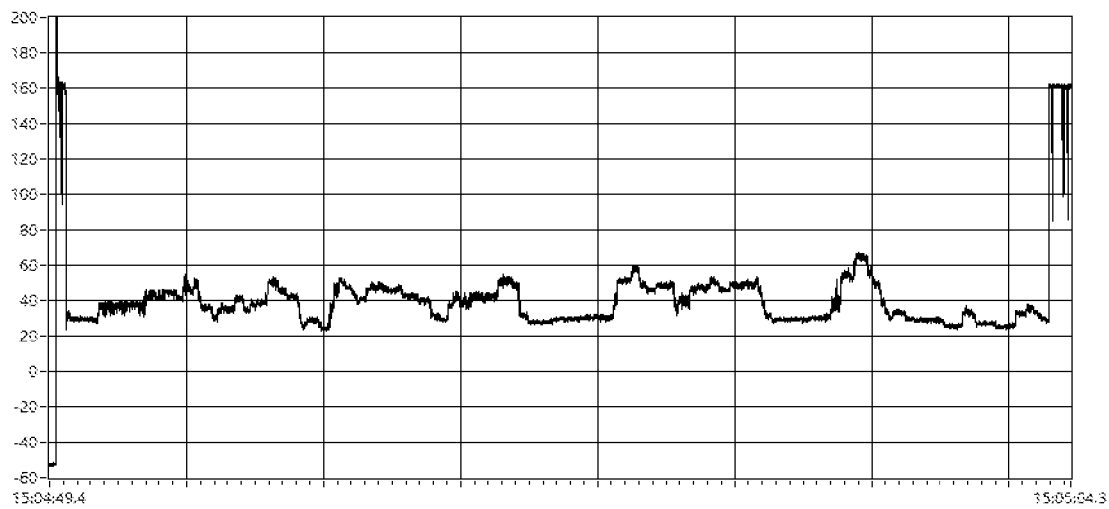
Figure 11D:
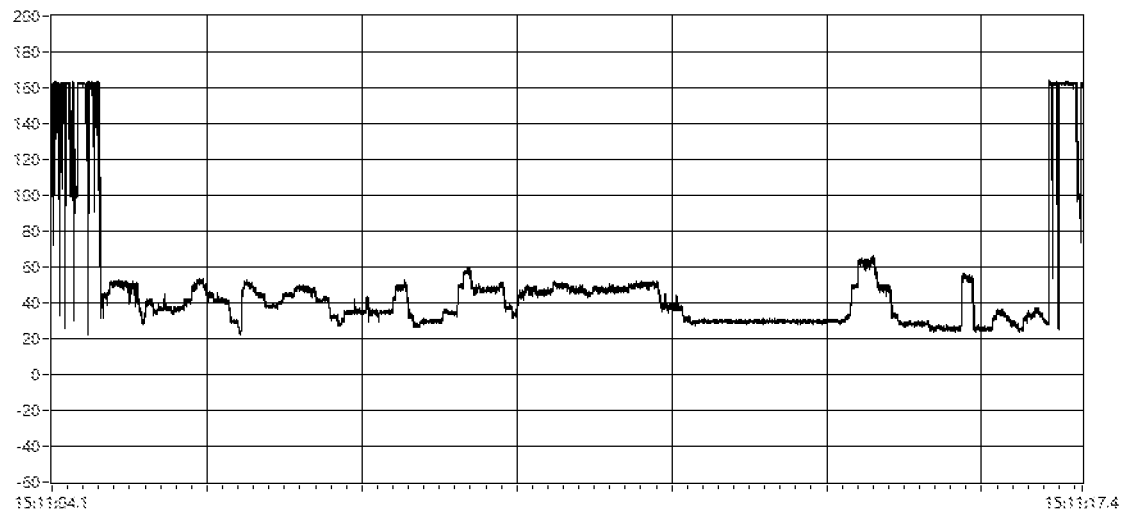
Figure 11E:
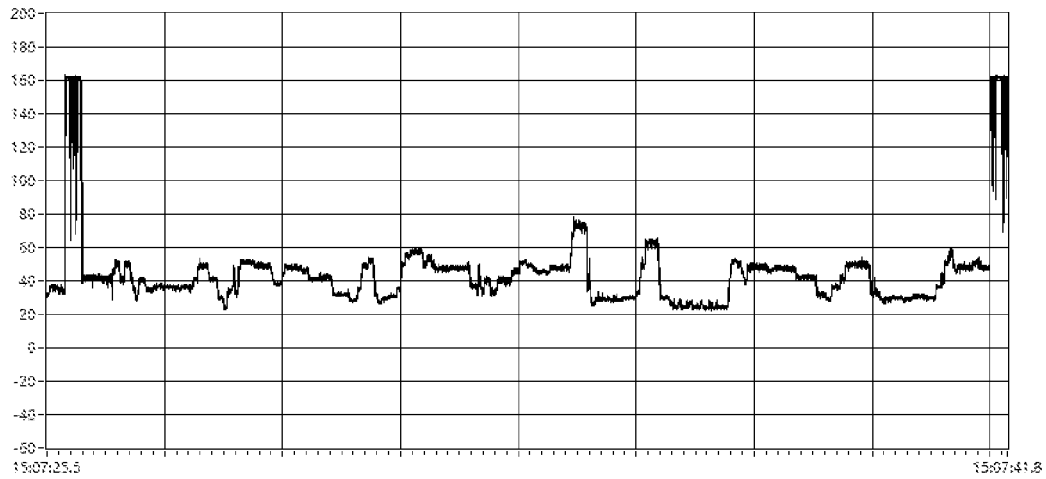
Figure 11F:
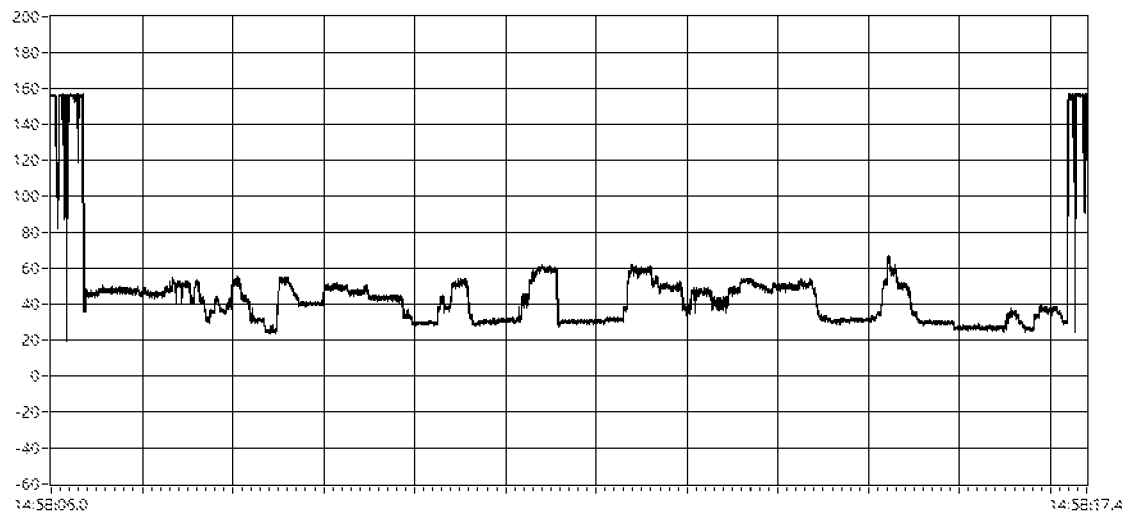

An example current trajectory when helicase (EF8813-1) controlled a DNA construct X2&cX2-80-15 to translocate through the nanopore including the Mnep-(G92K/D93F/G95L/A104K) monomer variant (see FIGS. 10A, 10B and 10C).

An example current trajectory when helicase (EF8813-1) controlled a DNA construct X2&cX2-80-15 to translocate through the nanopore including the Mnep-(G92K/D93F/G95L/A104K) monomer variant (see FIGS. 11A, 111B, 11C, 11D, 11E and 11F).

Figure 12A:
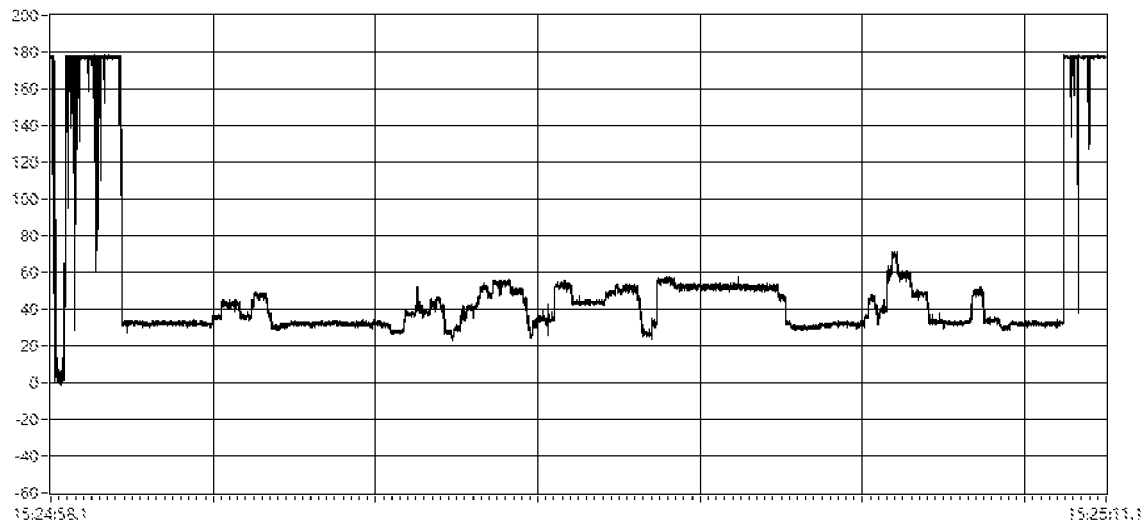
FIG. 12A: an example current trajectory when helicase (EF8813-1) controls a DNA construct S1T&S1MC to translocate through a nanopore including a Mnep-(G92K/D93F/G95L/A104K) monomer variant.
Figure 12B:
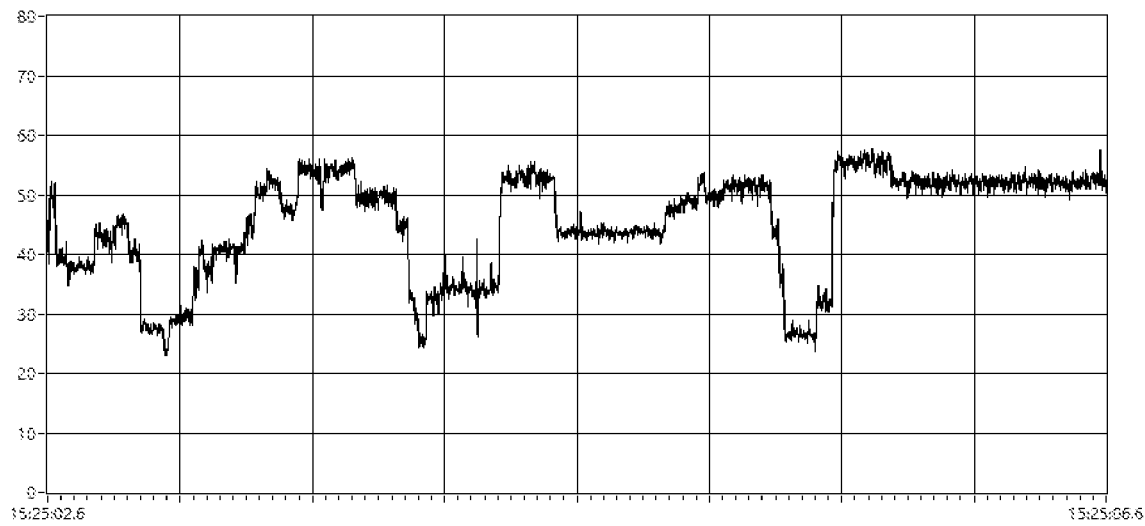
FIGS. 12B and 12C are the amplification results of the current trajectory in some areas of FIG. 12A. The maximum current value indicated by an arrow in FIG. 12C shows a characteristic peak of dspacer, wherein y-axis coordinates of the two trajectories=current (pA), and x-axis coordinates=time (s).
Figure 12C:
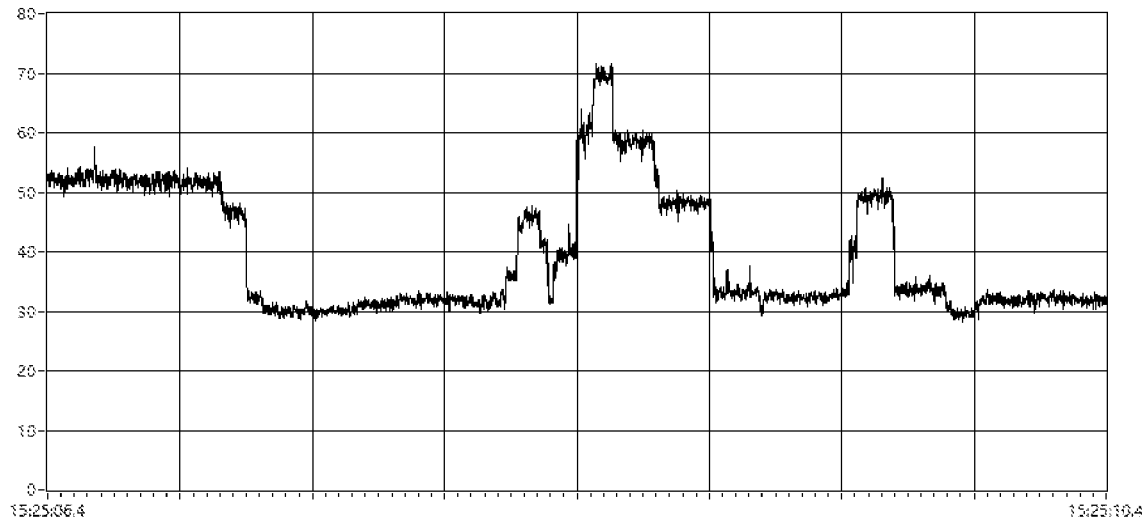

An example current trajectory when helicase (EF8813-1) controlled a DNA construct S1T&S1MC to translocate through a mutant Mnep-(G92K/D93F/G95L/A104K) nanopore (see FIGS. 12A, 12B and 12C).

The preferred implementations of the present invention are described in detail above, but the present invention is not limited to specific details in the above implementations. Various simple variations can be made to the technical solutions of the present invention within the scope of the technical concepts of the present invention, and these simple variations shall fall within the scope of the protection of the present invention.

In addition, it should be noted that various specific technical features described in the above specific implementations can be combined by any appropriate means without contradiction. In order to avoid unnecessary repetition, the present invention will not illustrate various possible combination ways separately.

The invention claimed is:

1. A Mnep monomer variant, comprising a sequence that is at least 94% identical to SEQ ID NO: 1, wherein either one or more of the following are true:

(a) an amino acid at a position corresponding to position 92 of SEQ ID NO: 1 is not glycine (G);

(b) an amino acid at a position corresponding to position 93 of SEQ ID NO: 1 is not aspartic acid (D);

(c) an amino acid at a position corresponding to position 94 of SEQ ID NO: 1 is not proline (P);

(d) an amino acid at a position corresponding to position 95 of SEQ ID NO: 1 is not glycine (G);

(e) an amino acid at a position corresponding to position 96 of SEQ ID NO: 1 is not phenylalanine (F);

(f) an amino acid at a position corresponding to position 97 of SEQ ID NO: 1 is not glycine (G);

(g) an amino acid at a position corresponding to position 98 of SEQ ID NO: 1 is not isoleucine (I);

(h) an amino acid at a position corresponding to position 99 of SEQ ID NO: 1 is not threonine (T);

(i) an amino acid at a position corresponding to position 100 of SEQ ID NO: 1 is not glycine (G);

(j) an amino acid at a position corresponding to position 101 of SEQ ID NO: 1 is not isoleucine (I);

(k) an amino acid at a position corresponding to position 102 of SEQ ID NO: 1 is not glycine (G);
(l) an amino acid at a position corresponding to position 103 of SEQ ID NO: 1 is not glycine (G); and
(m) an amino acid at a position corresponding to position 104 of SEQ ID NO: 1 is not alanine (A).

2. The Mnep monomer variant of claim 1, wherein:
the amino acid at the position corresponding to position 92 of SEQ ID NO: 1 is arginine (R), glutamine (Q), lysine (K), phenylalanine (F), serine(S), asparagine (N), cysteine (C), or modified arginine (R), glutamine (Q), lysine (K), phenylalanine (F), serine(S), asparagine (N), cysteine (C) or a non-natural amino acid; or
the amino acid at the position corresponding to position 93 of SEQ ID NO: 1 is tryptophane (W), tyrosine (Y), phenylalanine (F), methionine (M), isoleucine (I), leucine (L), valine (V), proline (P), lysine (K), arginine (R), glutamine (Q) or asparagine (N), or modified tryptophane (W), tyrosine (Y), phenylalanine (F), methionine (M), isoleucine (I), leucine (L), valine (V), proline (P), lysine (K), arginine (R), glutamine (Q), asparagine (N) or a non-natural amino acid; or
the amino acid at the position corresponding to position 95 of SEQ ID NO: 1 is proline (P), tryptophane (W), phenylalanine (F), methionine (M), alanine (A), isoleucine (I), leucine (L), valine (V), lysine (K), arginine (R), glutamine (Q) or asparagine (N), or modified proline (P), tryptophane (W), phenylalanine (F), methionine (M), alanine (A), isoleucine (I), leucine (L), valine (V), lysine (K), arginine (R), glutamine (Q), asparagine (N) or a non-natural amino acid; or
the amino acid at the position corresponding to position 104 of SEQ ID NO: 1 is proline (P), phenylalanine (F), isoleucine (I), leucine (L), valine (V), lysine (K) or arginine (R), or modified proline (P), phenylalanine (F), isoleucine (I), leucine (L), valine (V), lysine (K), arginine (R) or a non-natural amino acid.

3. The Mnep monomer variant of claim 2, wherein either one or more of the following are true:
(1) the amino acid at the position corresponding to position 92 of SEQ ID NO: 1 is lysine (K);
(2) the amino acid at the position corresponding to position 93 of SEQ ID NO: 1 is phenylalanine (F);
(3) the amino acid at the position corresponding to position 95 of SEQ ID NO: 1 is leucine (L); and
(4) the amino acid at the position corresponding to position 104 of SEQ ID NO: 1 is lysine (K).

4. The Mnep monomer variant of claim 3, wherein:
the amino acid at the position corresponding to position 92 of SEQ ID NO: 1 is lysine (K);
the amino acid at the position corresponding to position 93 of SEQ ID NO: 1 is phenylalanine (F);
the amino acid at the position corresponding to position 95 of SEQ ID NO: 1 is leucine (L); and
the amino acid at the position corresponding to position 104 of SEQ ID NO: 1 is lysine (K).

5. The Mnep monomer variant of claim 1, wherein the Mnep monomer variant comprises a sequence that is at least 94% identical to SEQ ID NO: 1, wherein either one or more of the following are true:
(a) an amino acid at a position corresponding to position 76 of SEQ ID NO: 1 is not glycine (G),
(b) an amino acid at a position corresponding to position 78 of SEQ ID NO: 1 is not glycine (G),
(c) an amino acid at a position corresponding to position 110 of SEQ ID NO: 1 is not glutamic acid (E),
(d) an amino acid at a position corresponding to position 125 of SEQ ID NO: 1 is not aspartic acid (D),
(e) an amino acid at a position corresponding to position 133 of SEQ ID NO: 1 is not glutamine (Q),
(f) an amino acid at a position corresponding to position 141 of SEQ ID NO: 1 is not glutamic acid (E), and
(g) an amino acid at a position corresponding to position 146 of SEQ ID NO: 1 is not glutamic acid (E).

6. The Mnep monomer variant of claim 5, wherein:
the amino acid at the position corresponding to position 125 of SEQ ID NO: 1 is lysine (K), glutamine (Q), cysteine (C) or asparagine (N), or modified lysine (K), glutamine (Q), cysteine (C) or asparagine (N), or non-natural amino acid; or
the amino acid at the position corresponding to position 141 of SEQ ID NO: 1 is lysine (K), asparagine (N) or glutamine (Q), or modified lysine (K), asparagine (N) or glutamine (Q), or a non-natural amino acid; or
the amino acid at the position corresponding to position 146 of SEQ ID NO: 1 is arginine (R), asparagine (N) or glutamine (Q), or modified arginine (R), asparagine (N) or glutamine (Q), or a non-natural amino acid; or
the amino acid at the position corresponding to position 110 of SEQ ID NO: 1 is phenylalanine (F), valine (V), isoleucine (I), leucine (L), alanine (A) or tyrosine (Y), or modified phenylalanine (F), valine (V), isoleucine (I), leucine (L), alanine (A) or tyrosine (Y), or a non-natural amino acid; or
the amino acid at the position corresponding to position 76 of SEQ ID NO: 1 is serine(S), threonine (T) or arginine (R), or modified serine(S), threonine (T) or arginine (R), or a non-natural amino acid; or
the amino acid at the position corresponding to position 78 of SEQ ID NO: 1 is serine(S), threonine (T) or arginine (R), or modified serine(S), threonine (T) or arginine (R), or a non-natural amino acid; or
the amino acid at the position corresponding to position 133 of SEQ ID NO: 1 is asparagine (N), serine(S) or threonine (T), or modified asparagine (N), serine(S) or threonine (T), or a non-natural amino acid.

7. The Mnep monomer variant of claim 1, wherein the Mnep monomer variant comprises a sequence that is at least 95% identical to SEQ ID NO: 1.

8. The Mnep monomer variant of claim 1, wherein the Mnep monomer variant comprises a sequence that is at least 98% identical to SEQ ID NO: 1.

9. A porin comprising at least one Mnep monomer variant, wherein the at least one Mnep monomer variant comprises a sequence that is at least 94% identical to SEQ ID NO: 1, wherein the sequence comprises one or more of the following mutations:
(a) an amino acid at a position corresponding to position 92 of SEQ ID NO: 1 is not glycine (G);
(b) an amino acid at a position corresponding to position 93 of SEQ ID NO: 1 is not aspartic acid (D);
(c) an amino acid at a position corresponding to position 94 of SEQ ID NO: 1 is not proline (P);
(d) an amino acid at a position corresponding to position 95 of SEQ ID NO: 1 is not glycine (G);
(e) an amino acid at a position corresponding to position 96 of SEQ ID NO: 1 is not phenylalanine (F);
(f) an amino acid at a position corresponding to position 97 of SEQ ID NO: 1 is not glycine (G);
(g) an amino acid at a position corresponding to position 98 of SEQ ID NO: 1 is not isoleucine (I);
(h) an amino acid at a position corresponding to position 99 of SEQ ID NO: 1 is not threonine (T);

(i) an amino acid at a position corresponding to position 100 of SEQ ID NO: 1 is not glycine (G);

(j) an amino acid at a position corresponding to position 101 of SEQ ID NO: 1 is not isoleucine (I);

(k) an amino acid at a position corresponding to position 102 of SEQ ID NO: 1 is not glycine (G);

(l) an amino acid at a position corresponding to position 103 of SEQ ID NO: 1 is not glycine (G); and (m) an amino acid at a position corresponding to position 104 of SEQ ID NO: 1 is not alanine (A), and wherein the one or more mutations result in differences in resistance in a pore due to differences in physical or chemical properties of different types of nucleotides when a single polynucleotide strand passes through the porin comprising at least one Mnep monomer variant.

10. The porin of claim 9, wherein:

the amino acid at the position corresponding to position 92 of SEQ ID NO: 1 is arginine (R), glutamine (Q), lysine (K), phenylalanine (F), serine(S), asparagine (N), cysteine (C), or modified arginine (R), glutamine (Q), lysine (K), phenylalanine (F), serine(S), asparagine (N), cysteine (C) or a non-natural amino acid; or the amino acid at the position corresponding to position 93 of SEQ ID NO: 1 is tryptophane (W), tyrosine (Y), phenylalanine (F), methionine (M), isoleucine (I), leucine (L), valine (V), proline (P), lysine (K), arginine (R), glutamine (Q) or asparagine (N), or modified tryptophane (W), tyrosine (Y), phenylalanine (F), methionine (M), isoleucine (I), leucine (L), valine (V), proline (P), lysine (K), arginine (R), glutamine (Q) or asparagine (N) or a non-natural amino acid; or the amino acid at the position corresponding to position 95 of SEQ ID NO: 1 is proline (P), tryptophane (W), phenylalanine (F), methionine (M), alanine (A), isoleucine (I), leucine (L), valine (V), lysine (K), arginine (R), glutamine (Q) or asparagine (N), or modified proline (P), tryptophane (W), phenylalanine (F), methionine (M), alanine (A), isoleucine (I), leucine (L), valine (V), lysine (K), arginine (R), glutamine (Q), or asparagine (N) or a non-natural amino acid; or the amino acid at the position corresponding to position 104 of SEQ ID NO: 1 is proline (P), phenylalanine (F), isoleucine (I), leucine (L), valine (V), lysine (K) or arginine (R), or modified proline (P), phenylalanine (F), isoleucine (I), leucine (L), valine (V), lysine (K), or arginine (R) or a non-natural amino acid.

11. The porin of claim 9, wherein the Mnep monomer variant comprises at least one of the following mutations:
(1) G92K; (2) D93F; (3) G95L; (4) A104K.

12. The porin of claim 9, wherein the porin comprises 1-20 Mnep monomer variants, wherein the Mnep monomer variants are identical or different.

13. The porin of claim 12, wherein the porin further comprises wild-type Mnep monomers.

14. The porin of claim 13, wherein a first Mnep monomer variant and a second Mnep monomer variant of the Mnep monomers, a first wild-type Mnep monomer and a second wild-type Mnep monomer of the wild-type Mnep monomers, as well as the Mnep monomer variant and the wild-type Mnep monomer are covalently attached.

15. The porin according to claim 9, wherein a pore channel diameter of a narrow region of the porin is less than 18.7 Å or 17.2 Å.

16. A method for characterizing a target polynucleotide, the method comprising:

(a) contacting the target polynucleotide with the porin of claim 9, so that the target polynucleotide sequence passes through the porin; and (b) obtaining one or more characteristics of an interaction between the target nucleotide and the porin when the target polynucleotide passes through the porin to characterize the target polynucleotide.

17. The method of claim 16, wherein the step (a) comprises contacting the target polynucleotide with one or a combination of two or more of a nucleic acid binding protein, helicase, polymerase, reverse transcriptase, translocase, exonuclease, telomerase and/or topoisomerase, wherein a translocation speed of the target polynucleotide sequence passing through the porin is less than the translocation speed in the absence of the one or more of the nucleic acid binding protein, helicase, polymerase, reverse transcriptase, translocase, exonuclease, telomerase and/or topoisomerase.

18. The method of claim 16, wherein the method further comprises a step of applying a potential difference across the porin contacted with the target polynucleotide.

\* \* \* \* \*